(12) United States Patent
Dunkle et al.

(10) Patent No.: US 6,454,300 B1
(45) Date of Patent: Sep. 24, 2002

(54) AIR BAG TETHER RELEASE ASSEMBLY

(75) Inventors: Stephanie L Dunkle, Springboro; Mark Thomas Winters, Troy; Laura Adelle Hawthorn, Tipp City; Ryan Todd Pinsenschaum, Vandalia; Patrick W. Schatz, Lebanon; Ann L. Kneisly; Shawn Gregory Ryan, both of Dayton, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/074,421

(22) Filed: Feb. 12, 2002

Related U.S. Application Data

(60) Provisional application No. 60/271,883, filed on Feb. 27, 2001.

(51) Int. Cl.[7] .............................................. B60R 21/28
(52) U.S. Cl. ...................................... 280/742; 280/743.2
(58) Field of Search ............................ 280/743.2, 743.1, 280/741, 742, 740, 739

(56) References Cited

U.S. PATENT DOCUMENTS

| 5,707,078 | A | * | 1/1998 | Swanberg et al. | ........... 280/735 |
| 5,709,405 | A | * | 1/1998 | Saderholm et al. | ......... 280/736 |
| 5,762,367 | A | * | 6/1998 | Wolanin | ...................... 280/736 |
| 6,039,346 | A | * | 3/2000 | Ryan et al. | .................. 280/736 |
| 6,123,358 | A | * | 9/2000 | Ryan et al. | .................. 280/739 |
| 6,334,627 | B1 | * | 1/2002 | Heym et al. | ............. 280/728.1 |

* cited by examiner

Primary Examiner—Paul N. Dickson
Assistant Examiner—Faye Fleming
(74) Attorney, Agent, or Firm—Kathryn A. Marra

(57) ABSTRACT

A release mechanism of efficient construction and operation is provided to hold profile restraining air bag tethers in a shortened operative condition under a first set of predetermined conditions and to extend such tethers under a second set of predetermined conditions. The extension of the restraining tethers may be carried out in conjunction with the delivery of an increased volume of inflating gas to the air bag cushion utilizing a gas emitting inflator in conjunction with a dynamic variable inflation device to effect delivery of a proper volume of inflation gas while releasing the tethers from a restrained length condition.

32 Claims, 27 Drawing Sheets

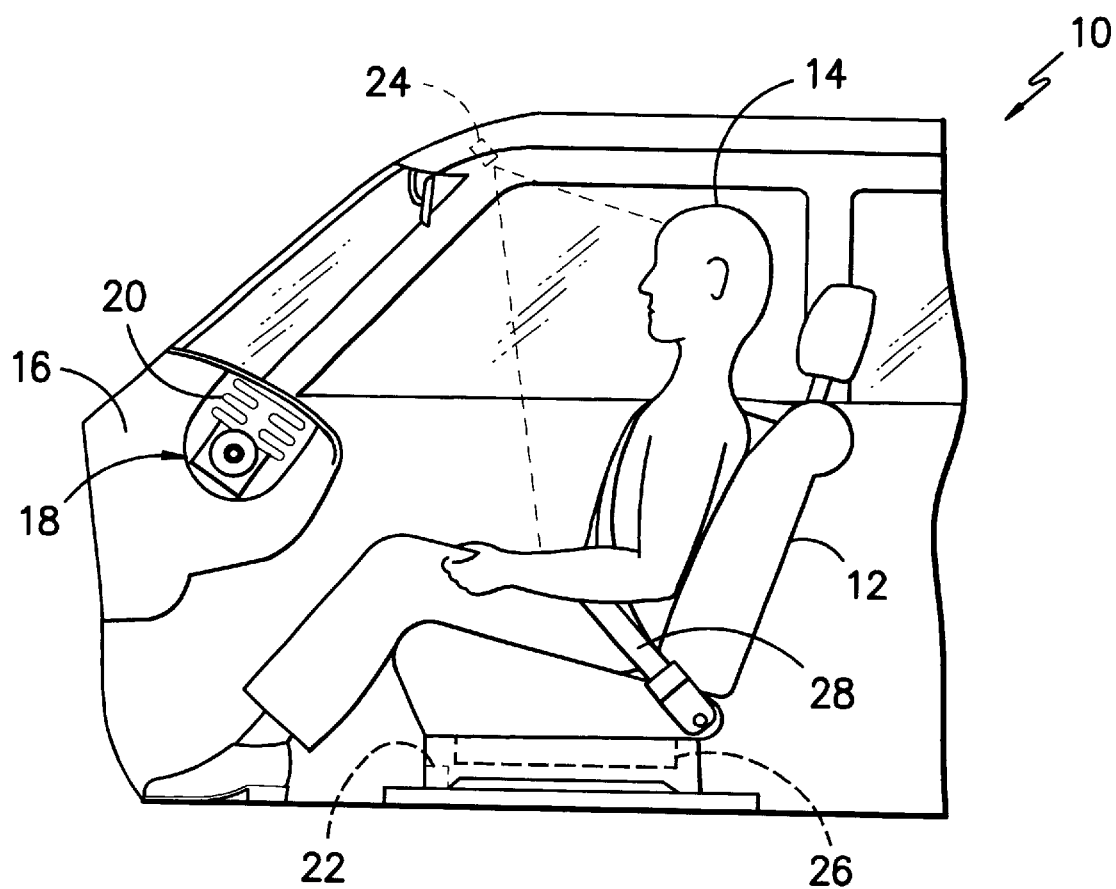
FIG. -1-

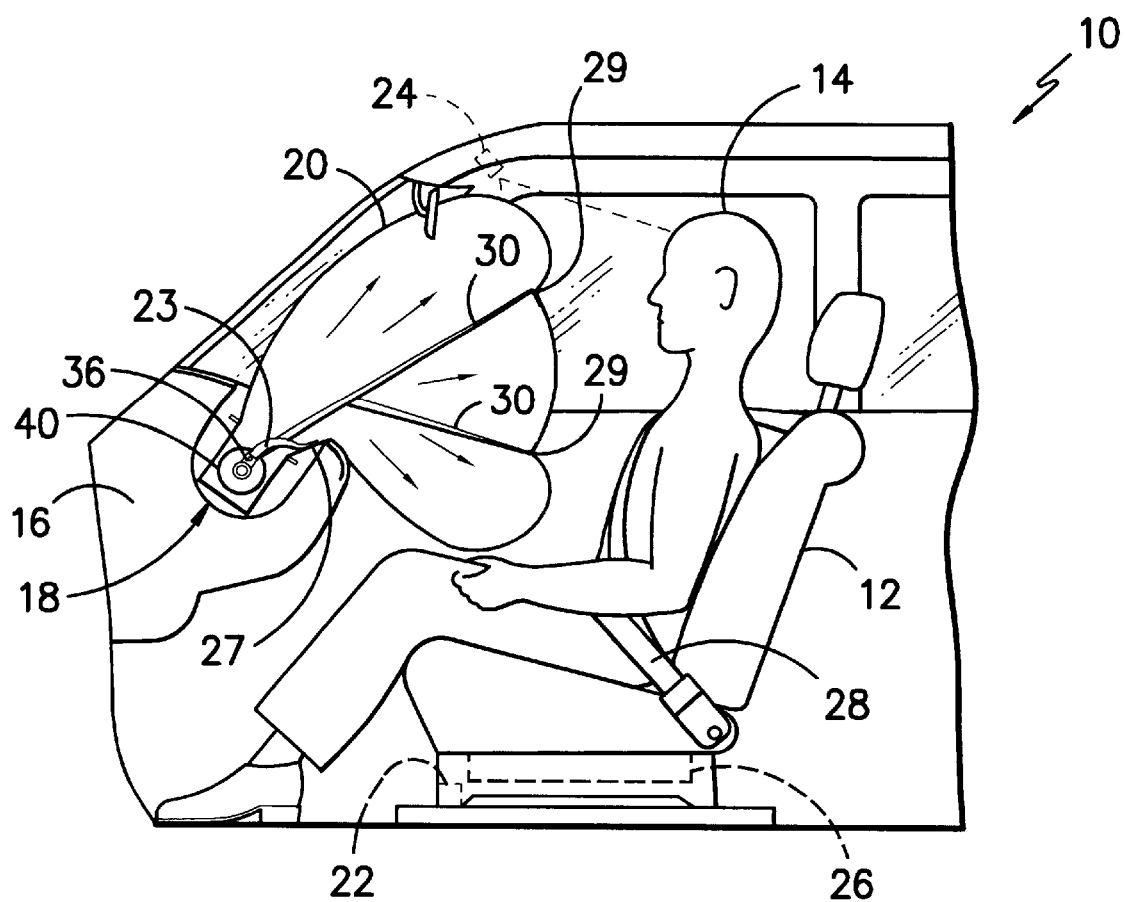
FIG. −2A−

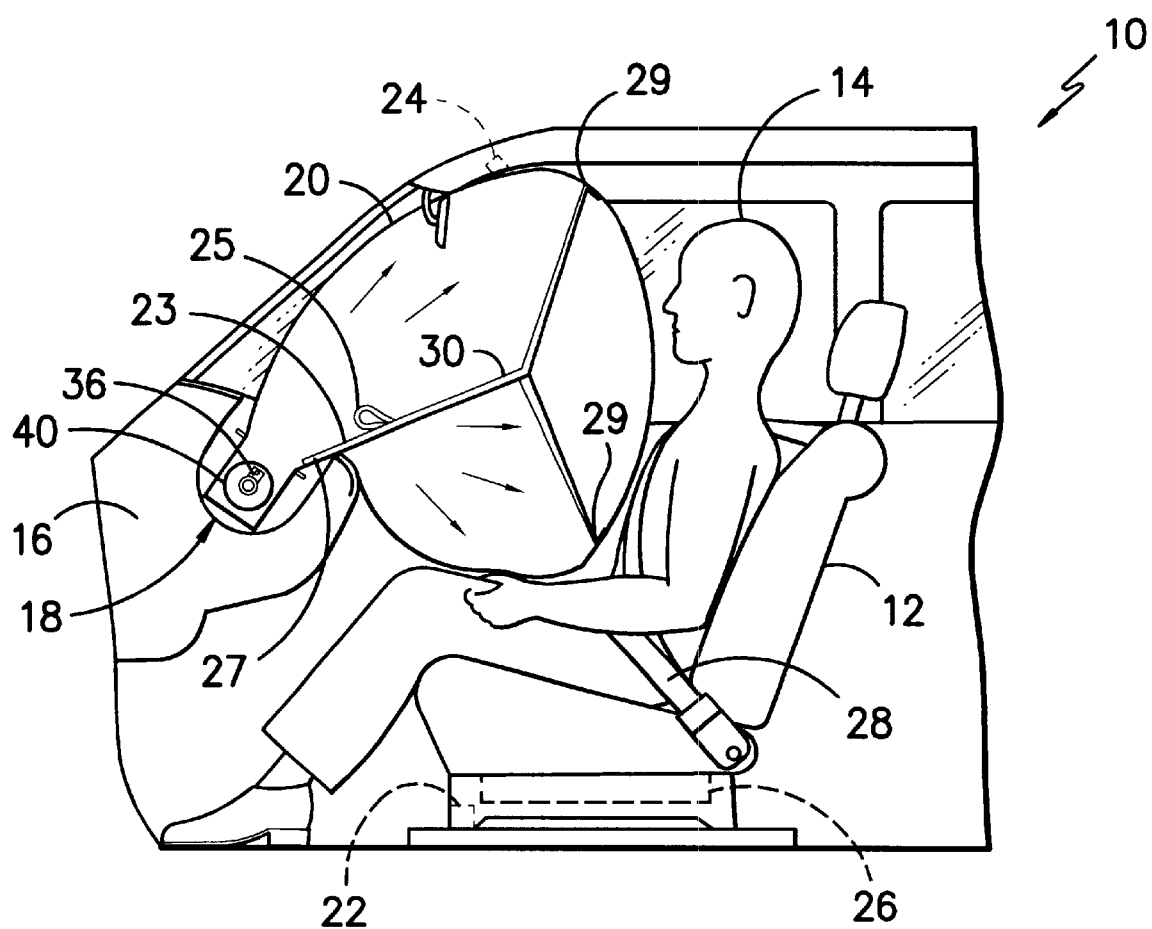
FIG. -2B-

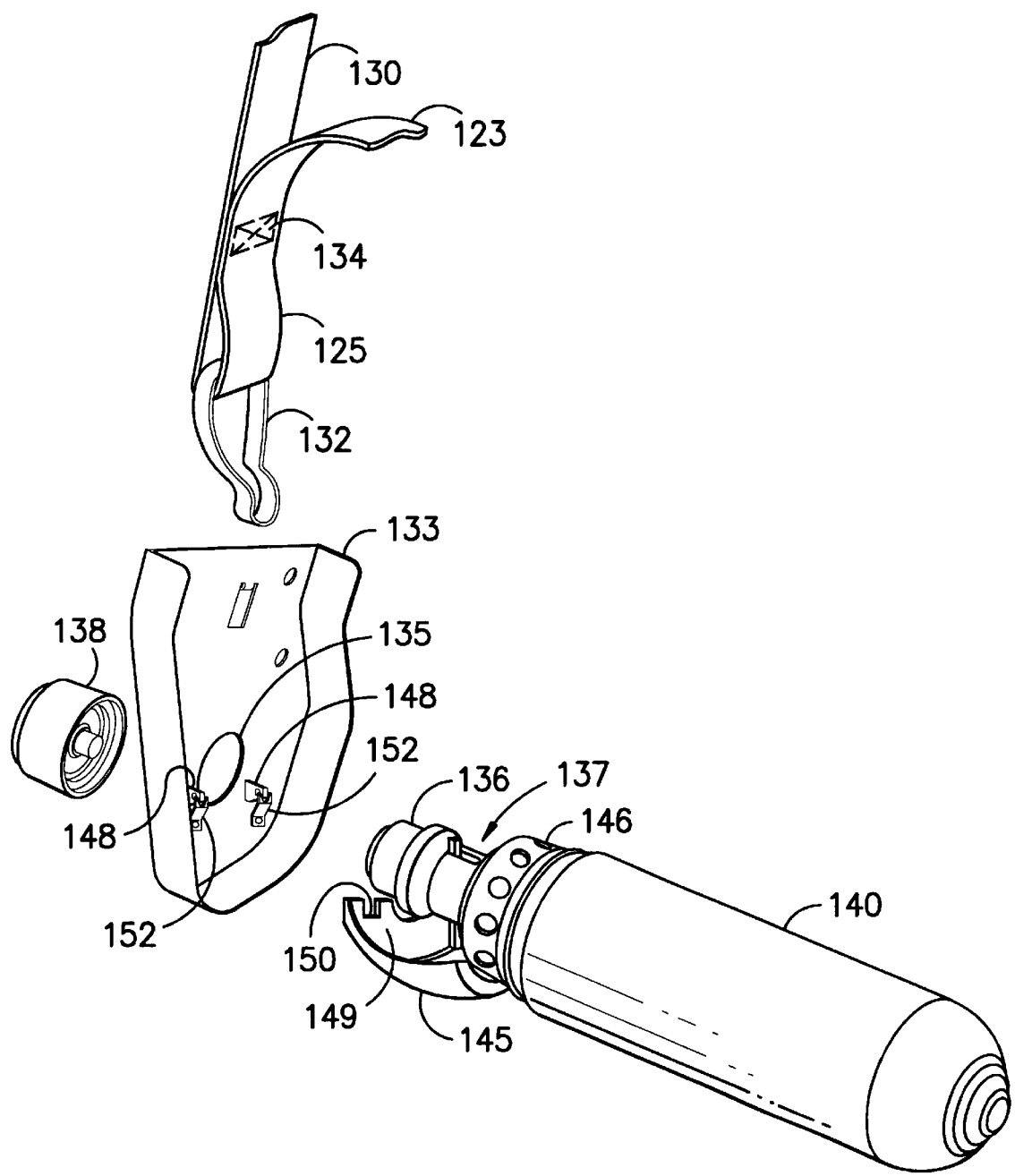
FIG. —3A—

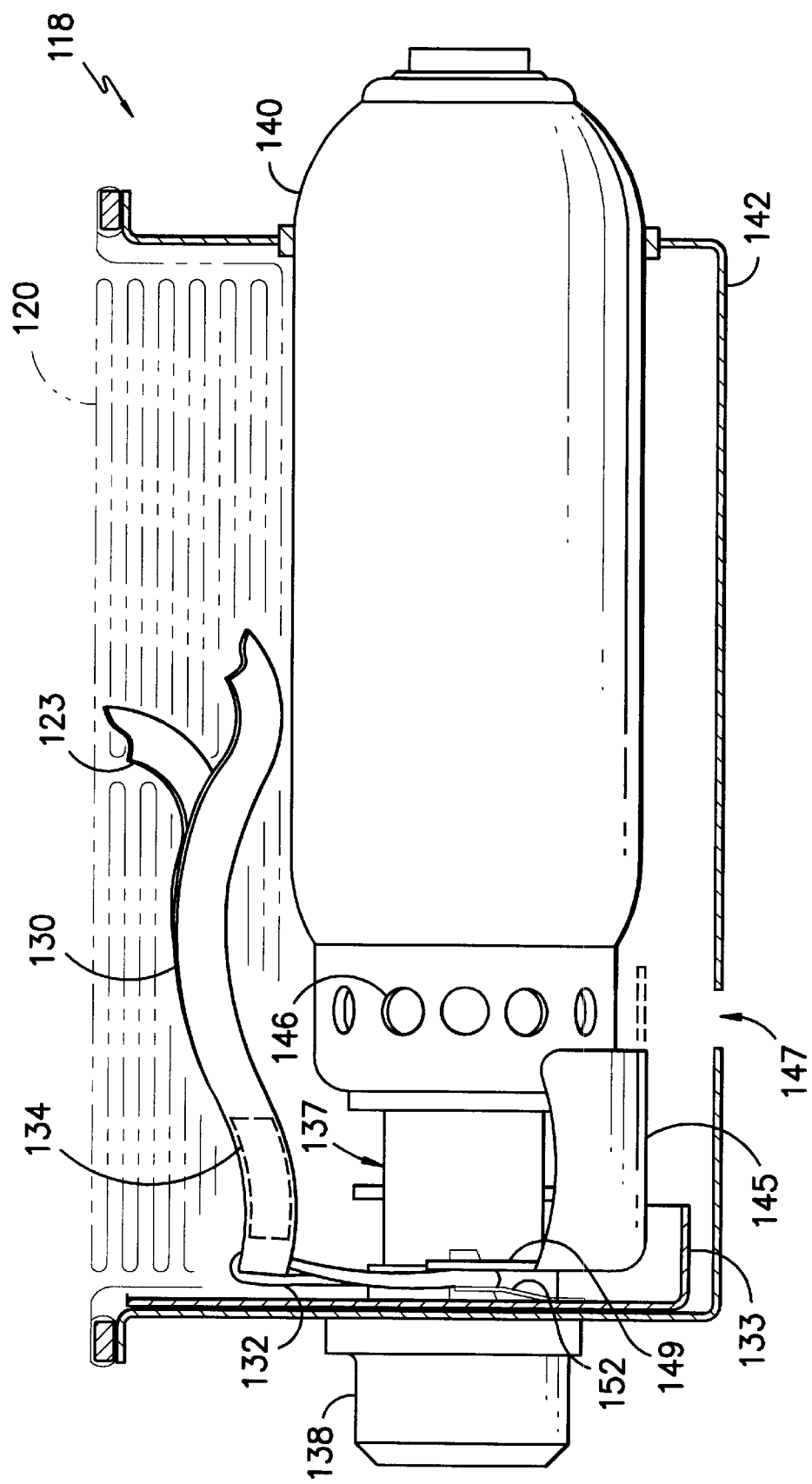
FIG. -3B-

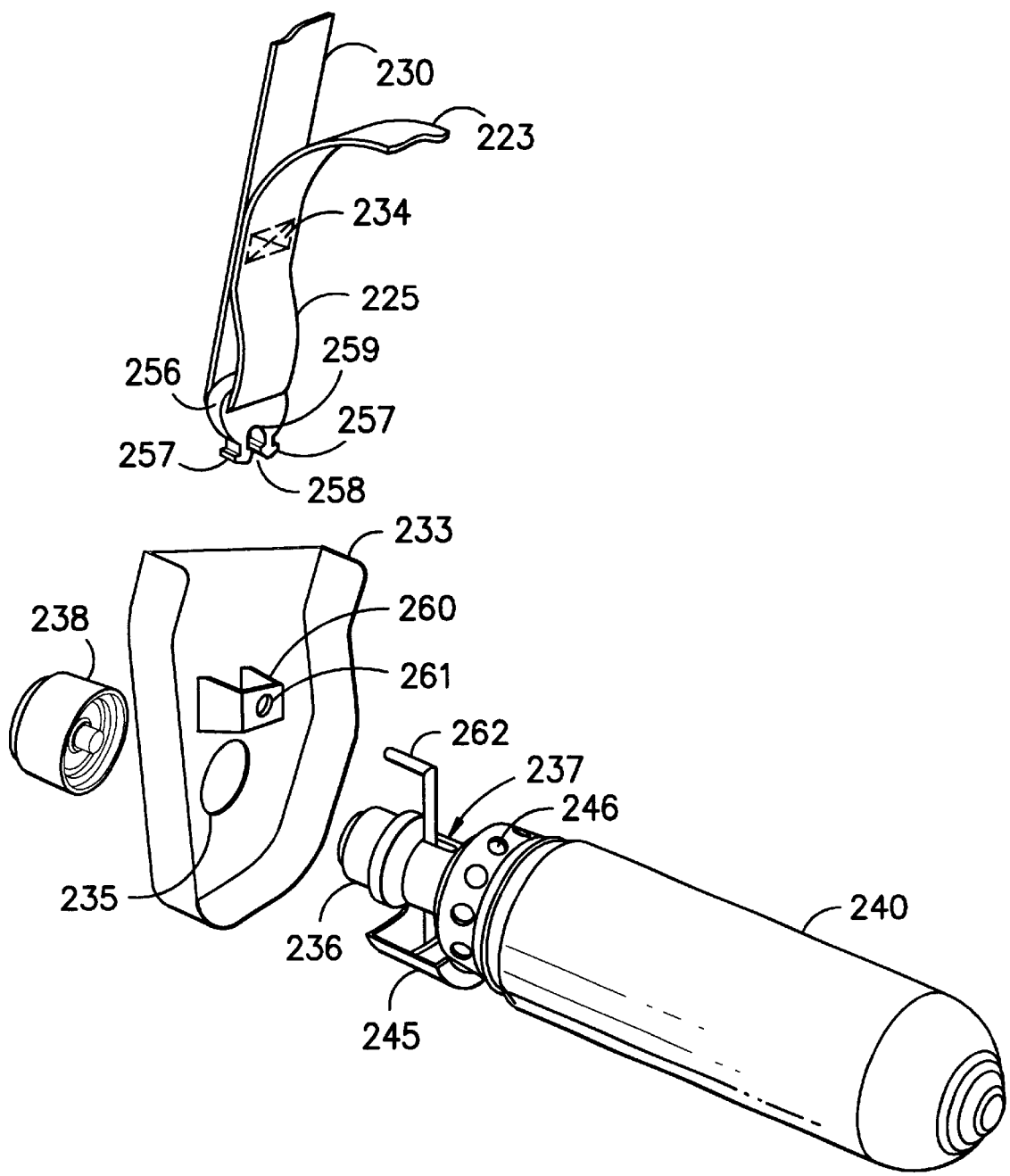
FIG. —4A—

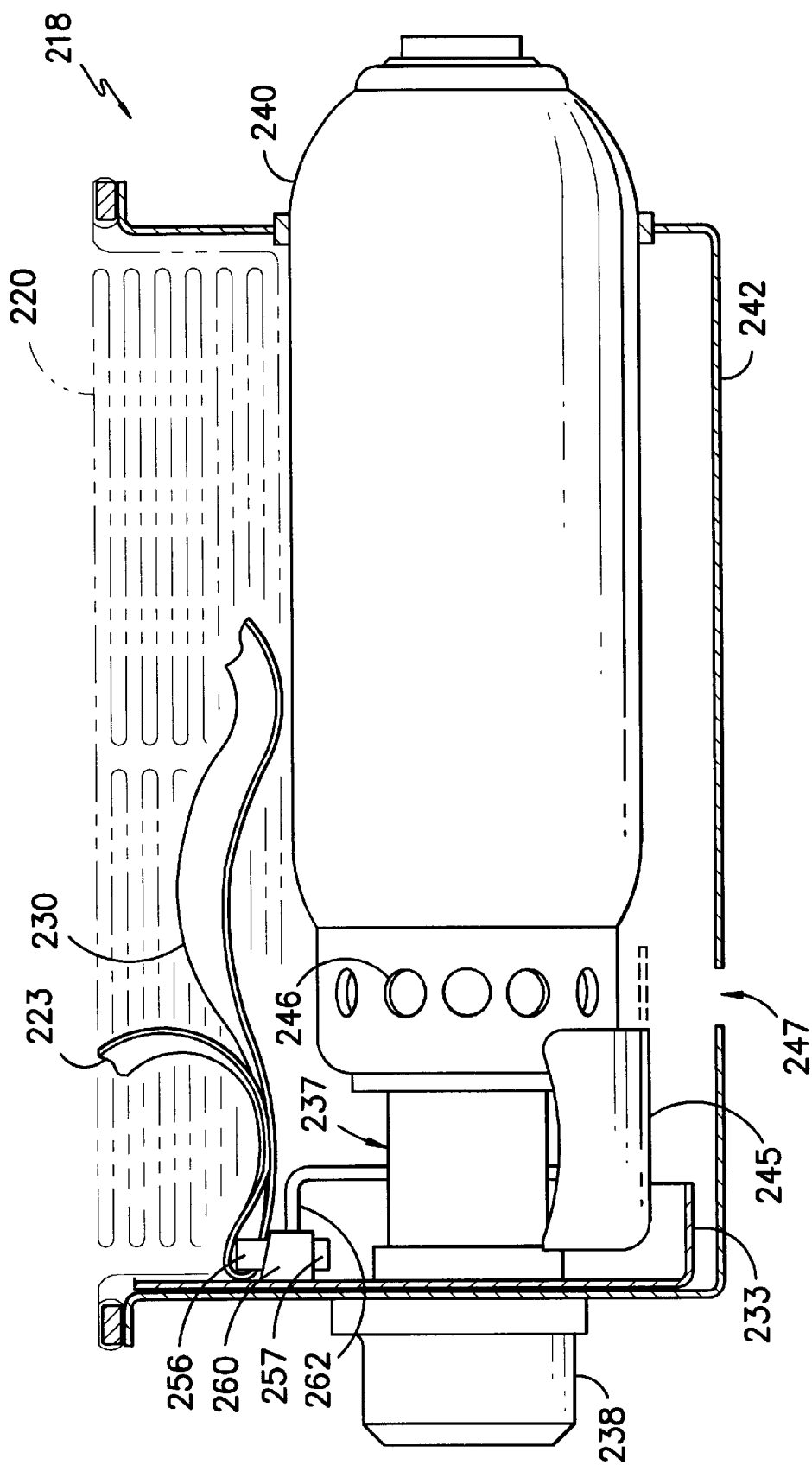
FIG. —4B—

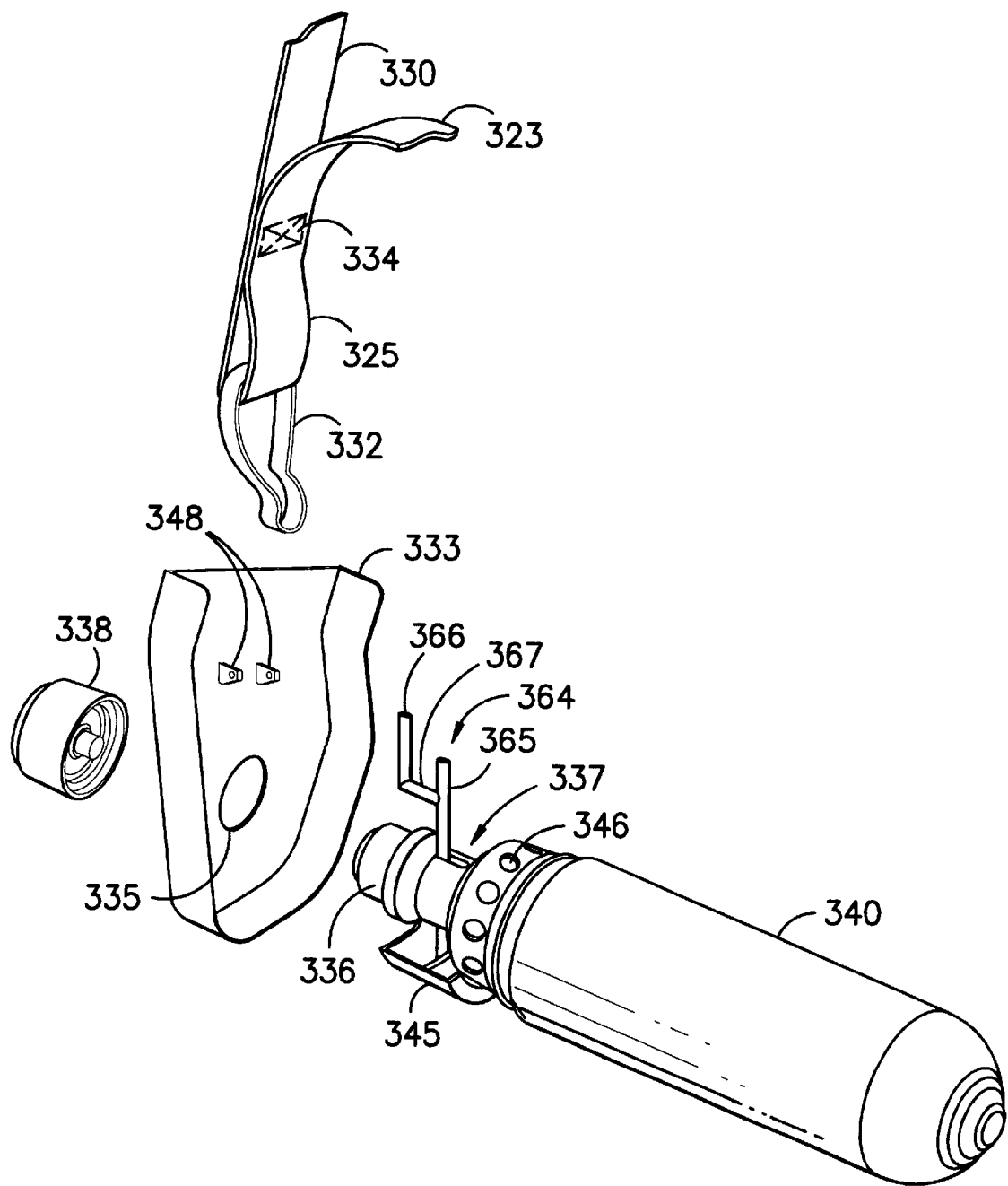
FIG. —5A—

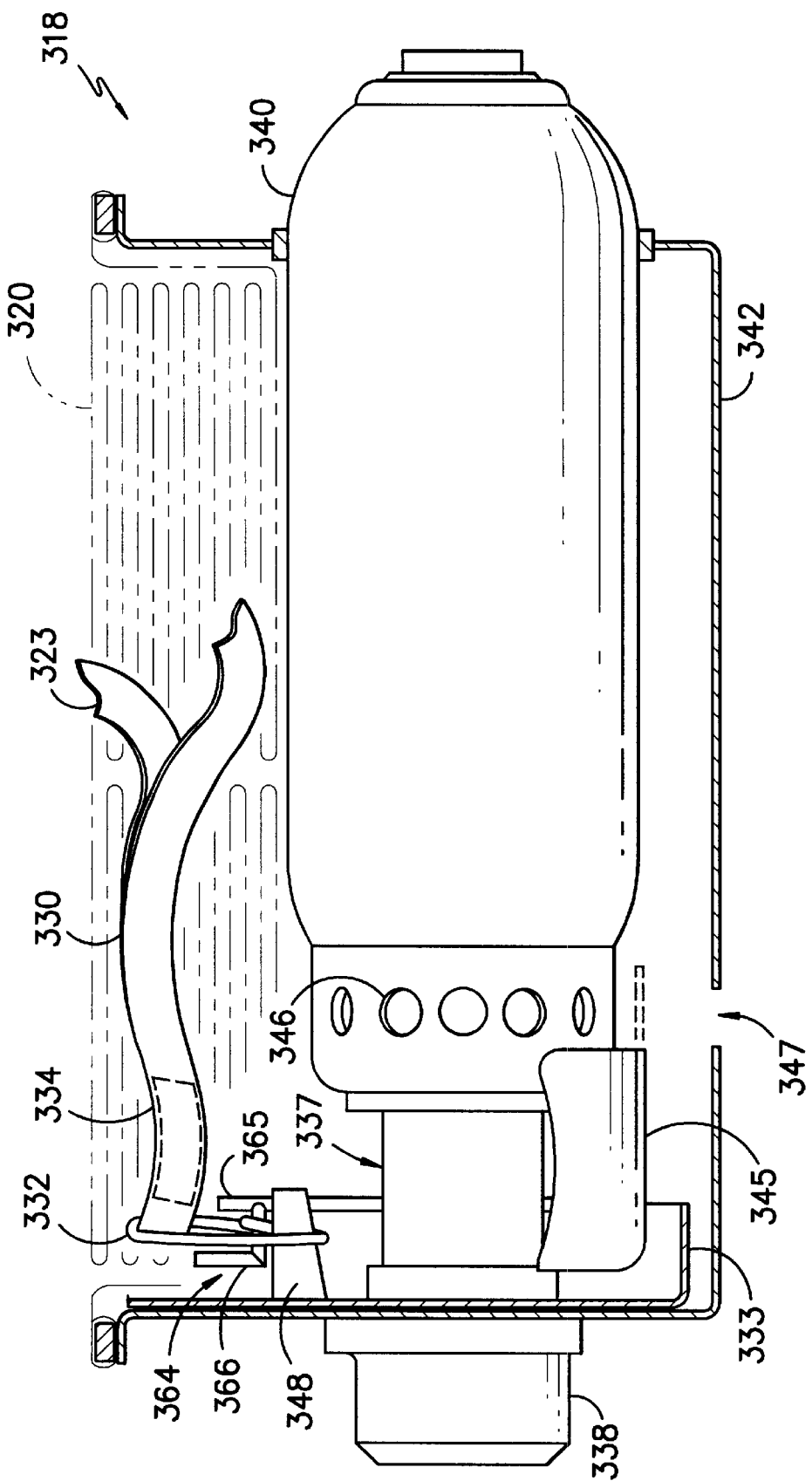
FIG. -5B-

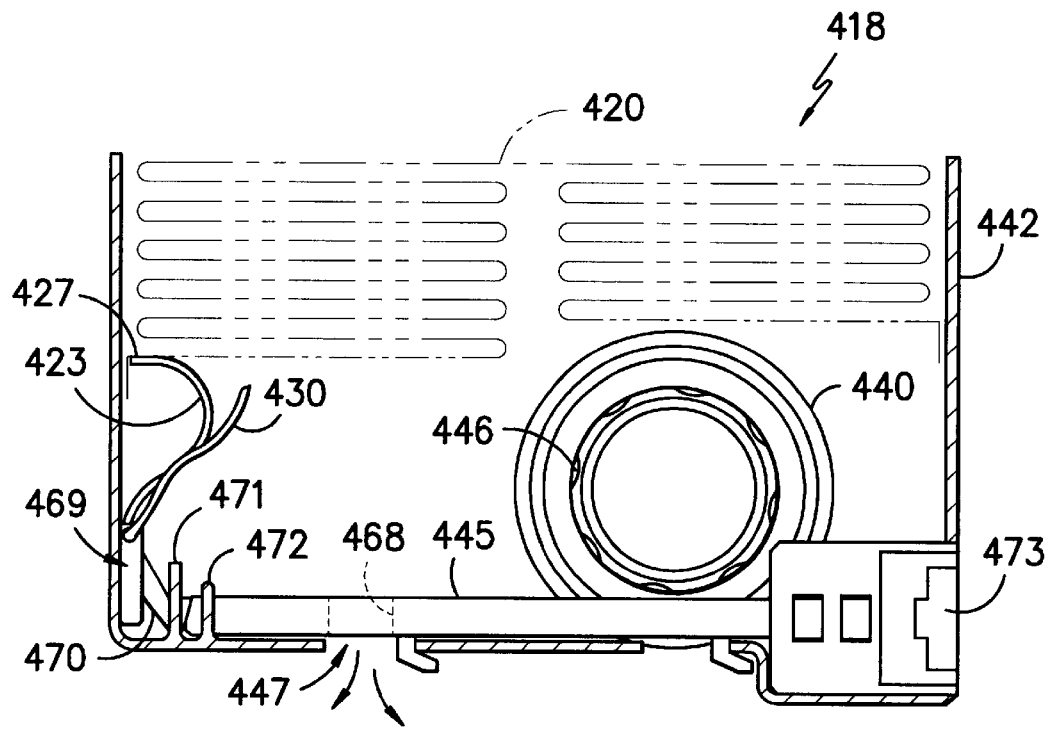
FIG. -6A-
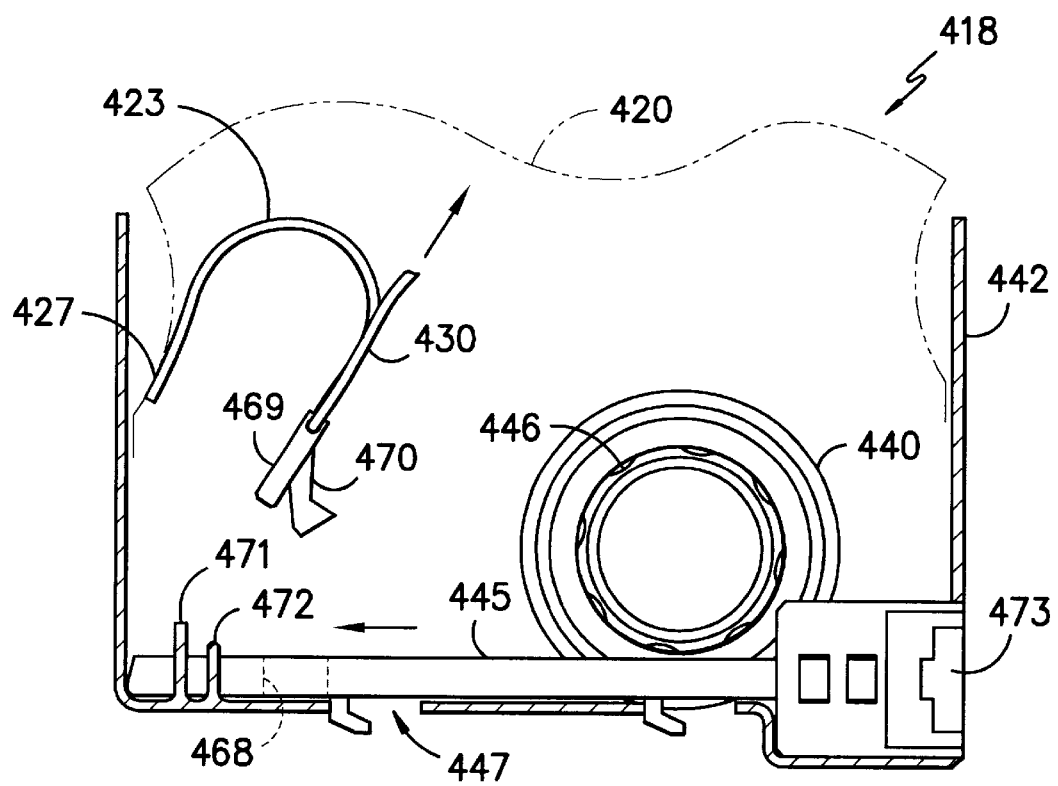
FIG. -6B-

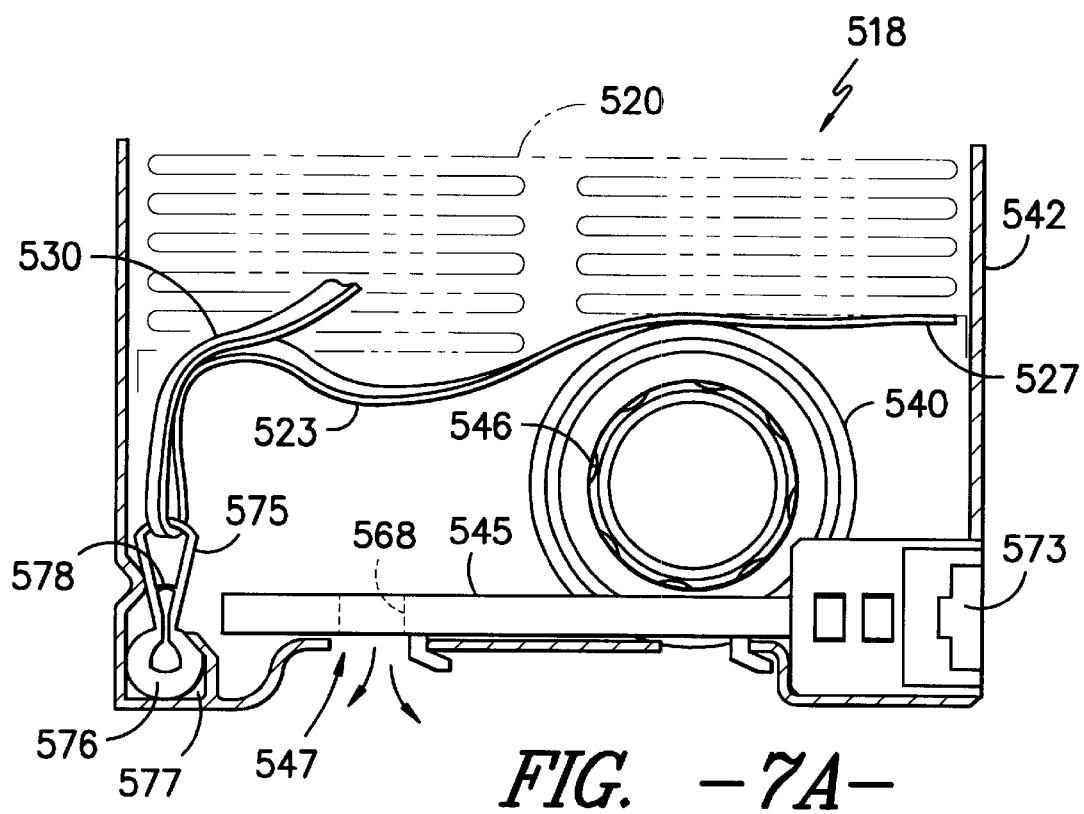
FIG. -7A-
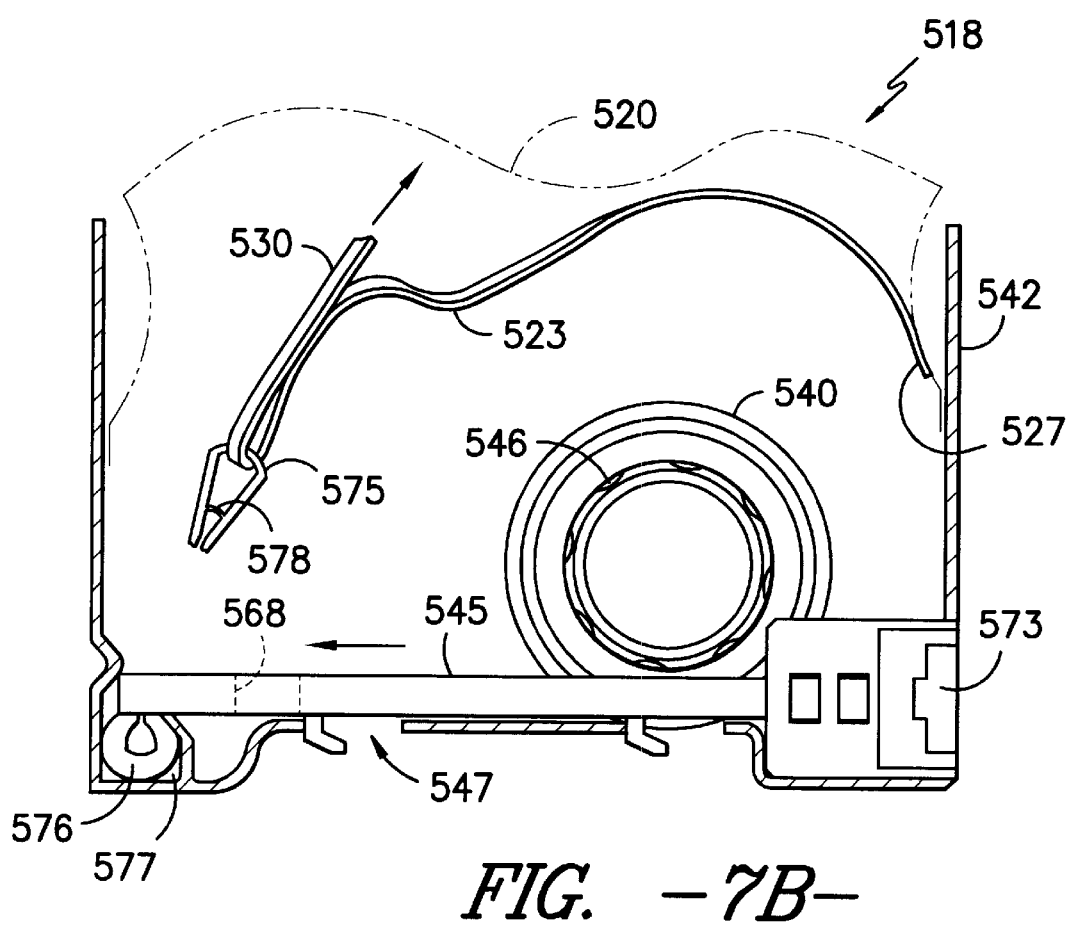
FIG. -7B-

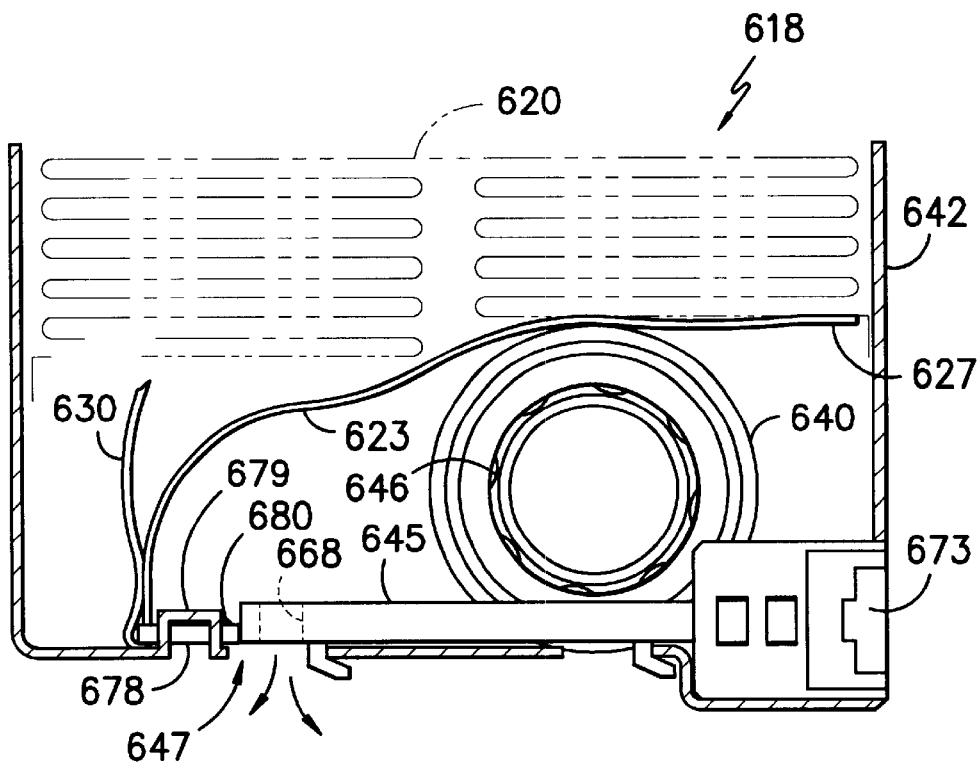
FIG. -8A-
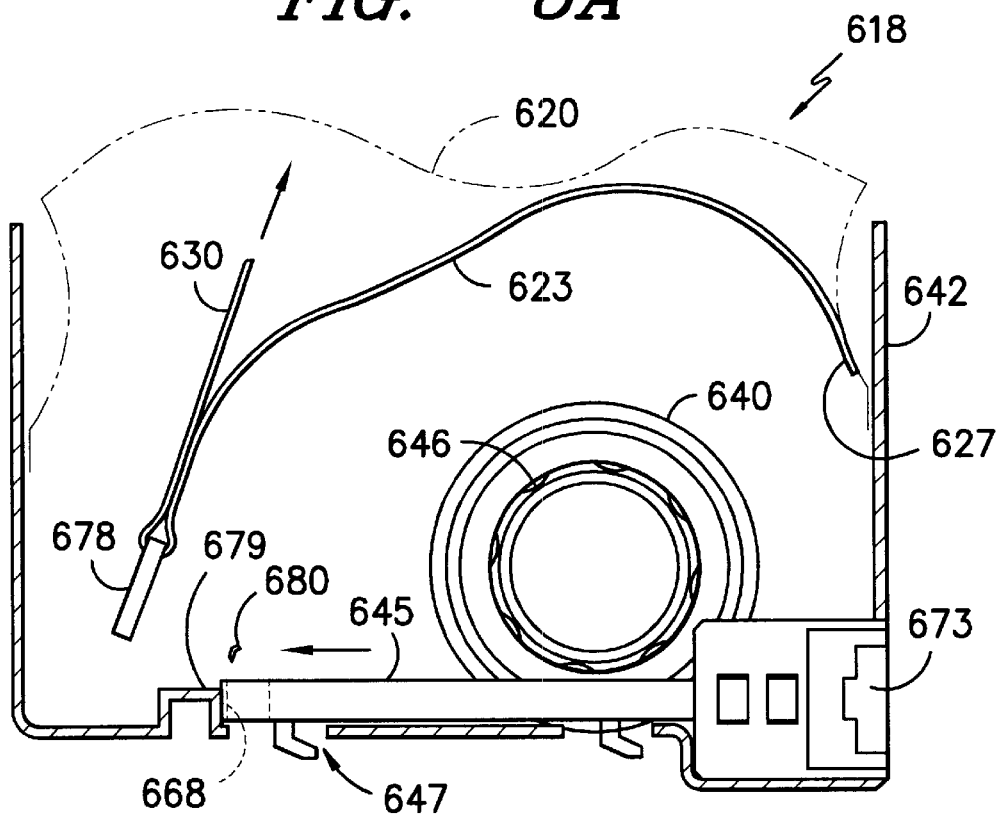
FIG. -8B-

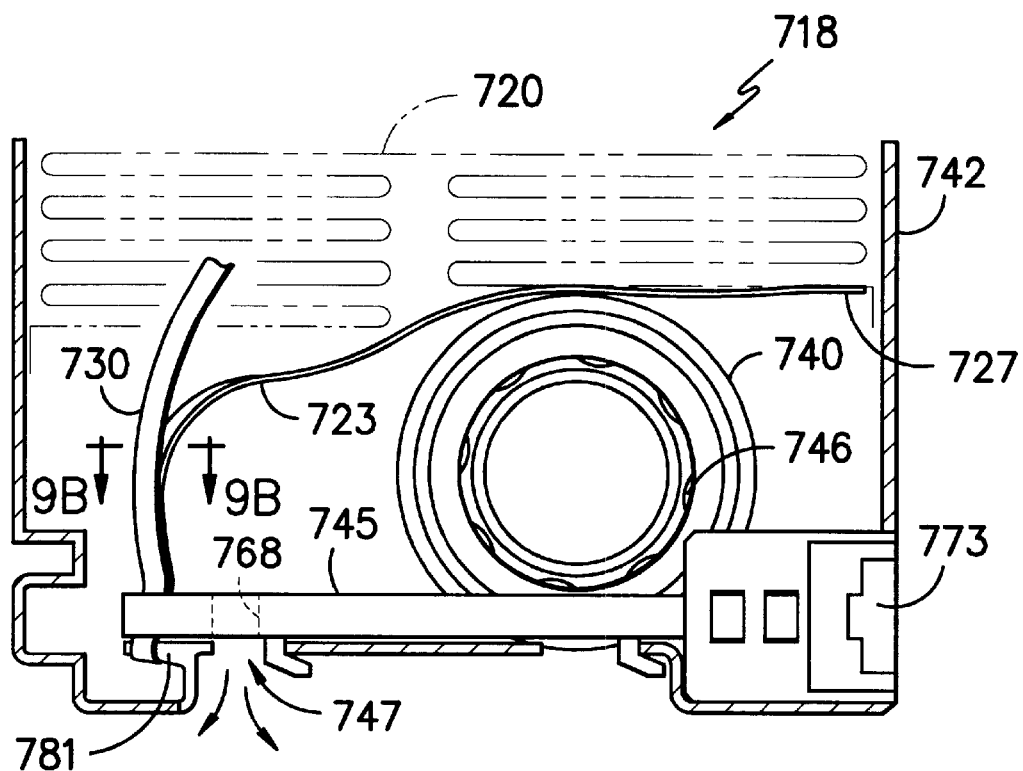
FIG. -9A-
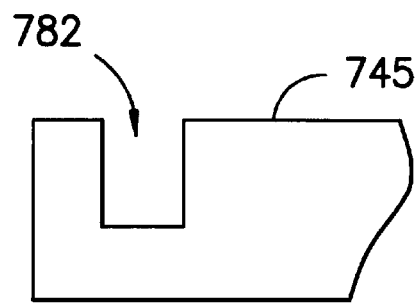
FIG. -9B-
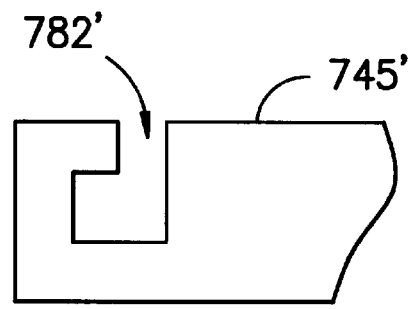
FIG. -9C-

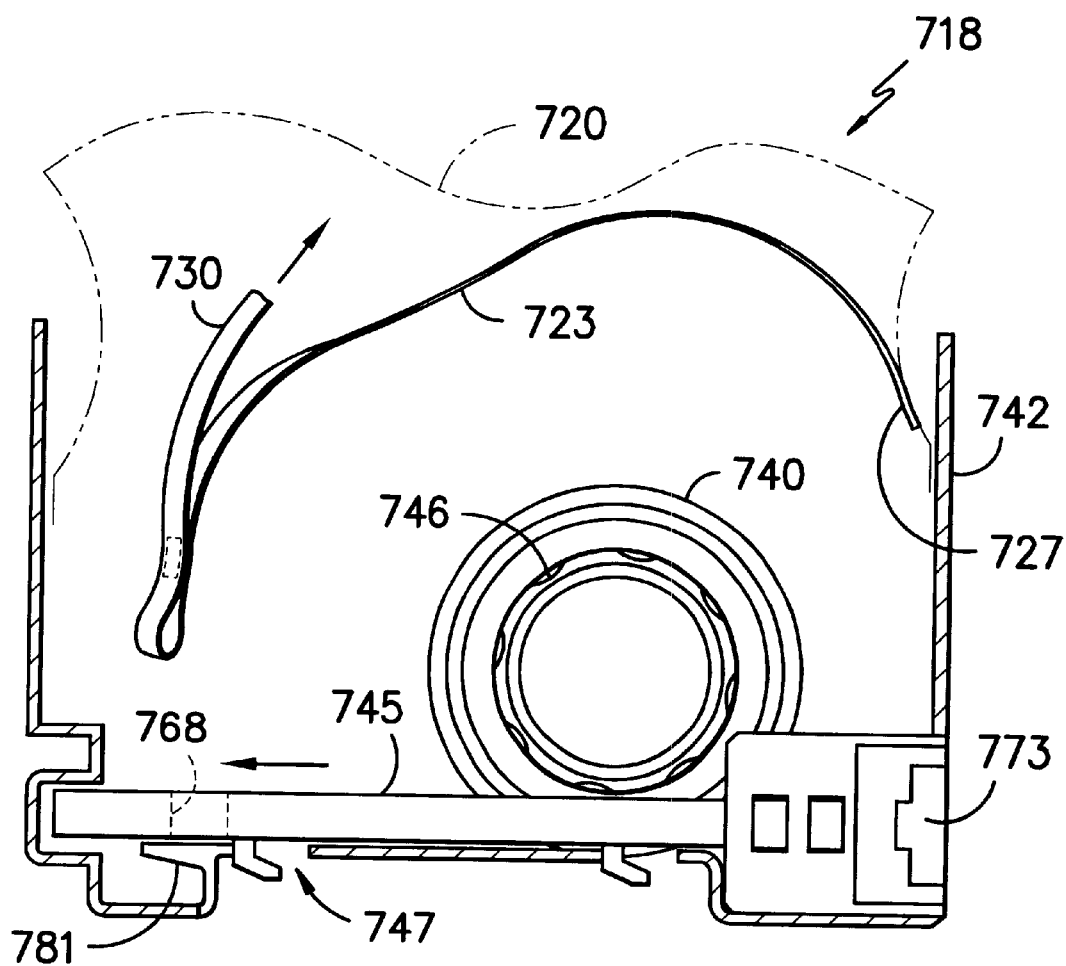
FIG. -9D-

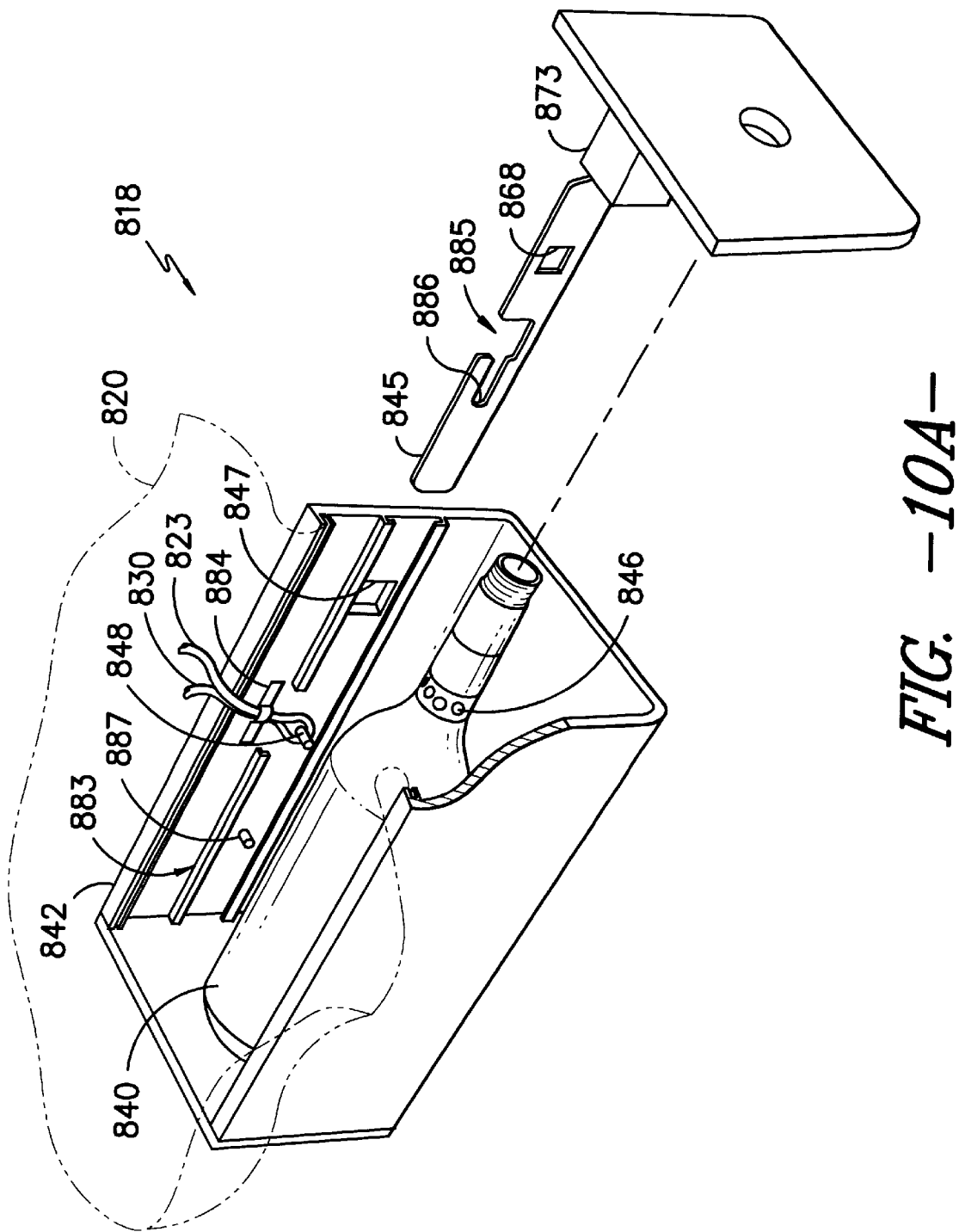
FIG. -10A-

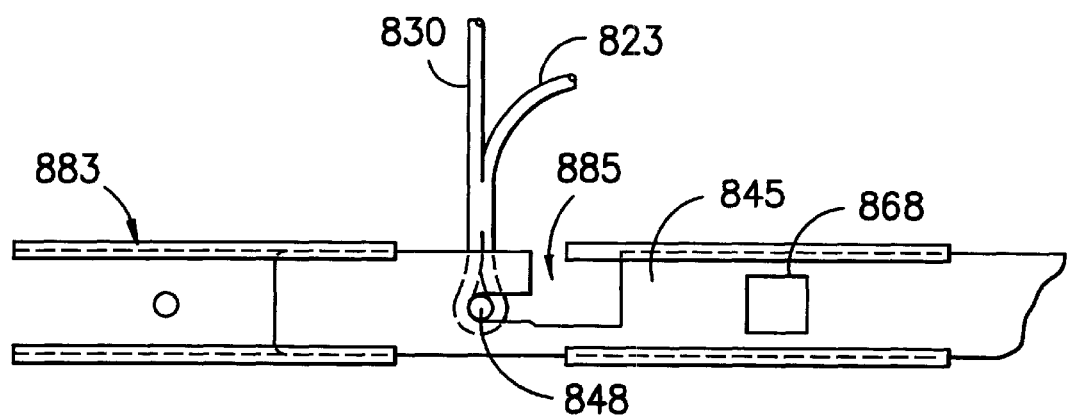
FIG. -10B-
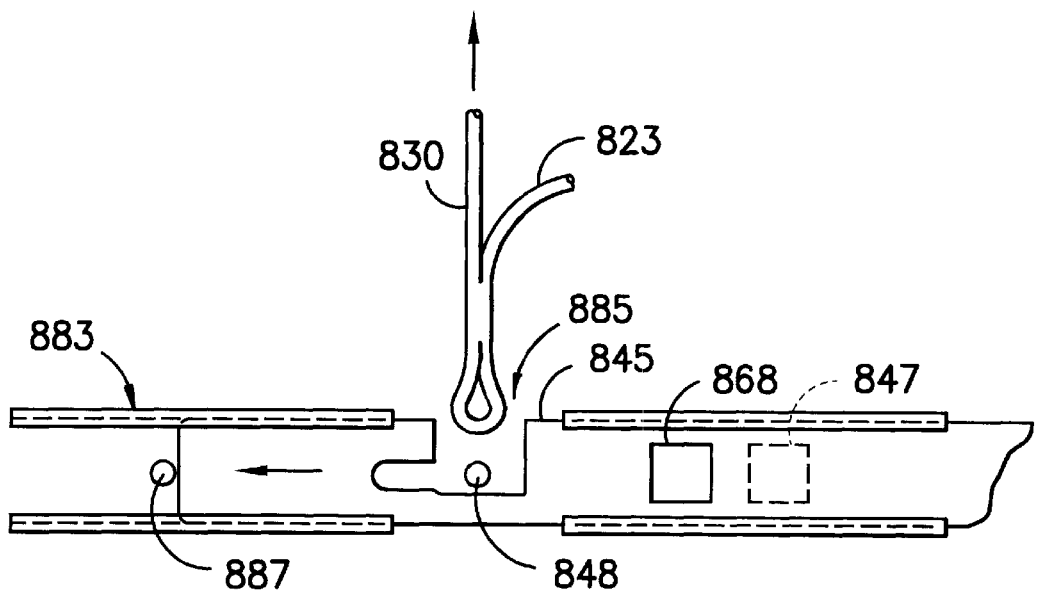
FIG. -10C-

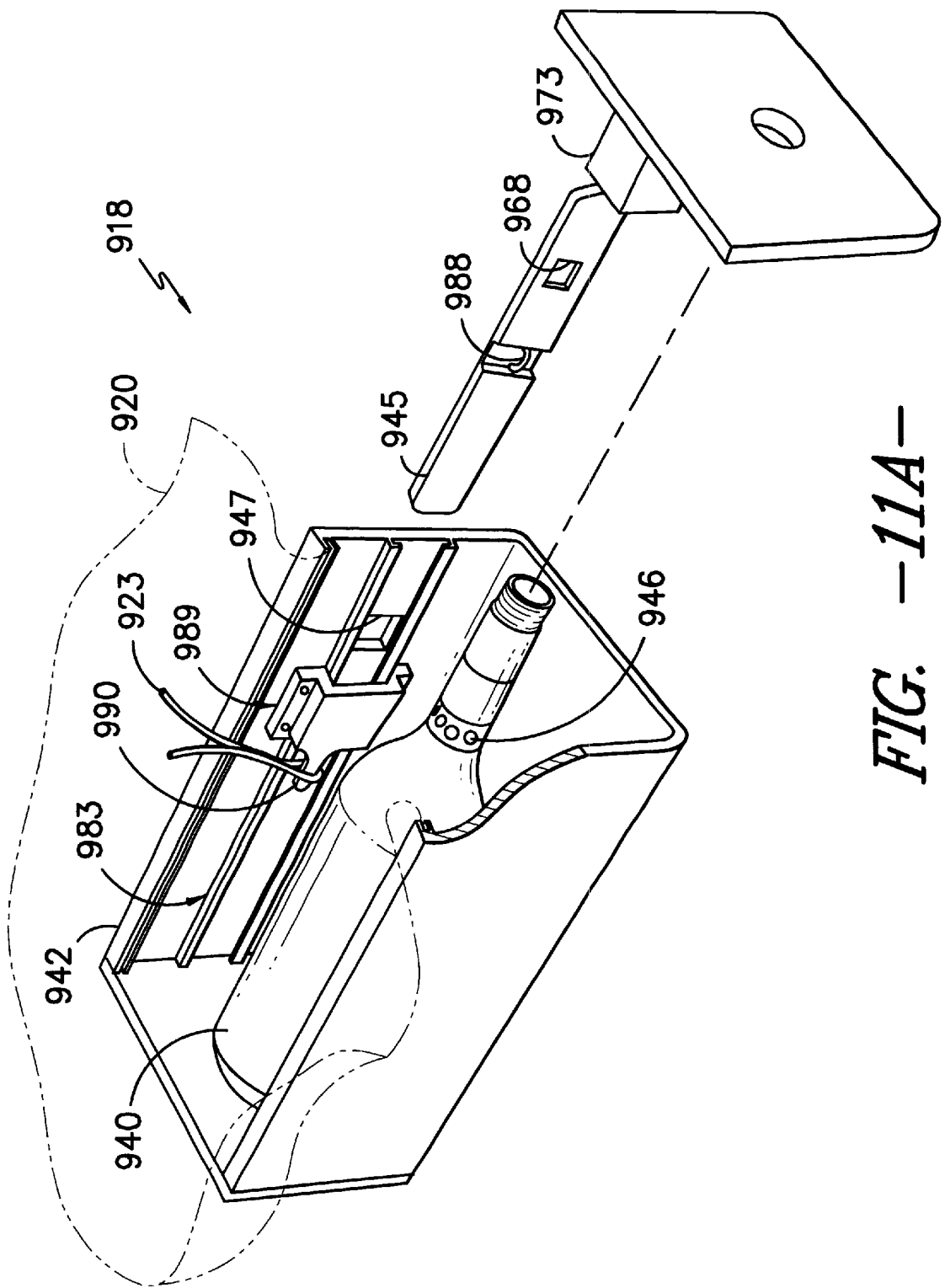
FIG. -11A-

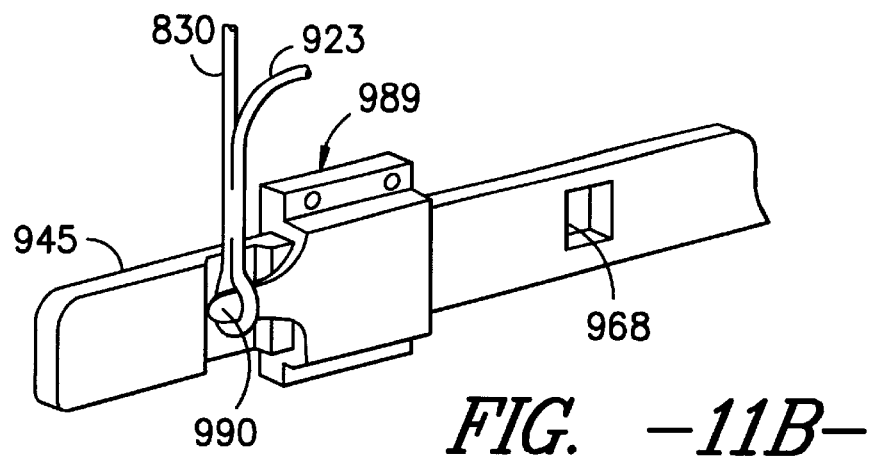
FIG. −11B−
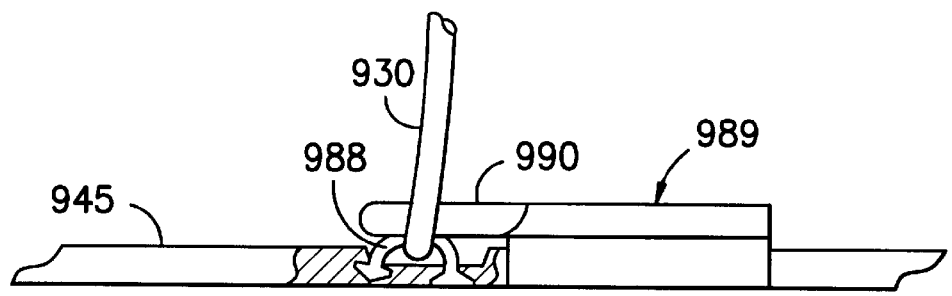
FIG. −11C−
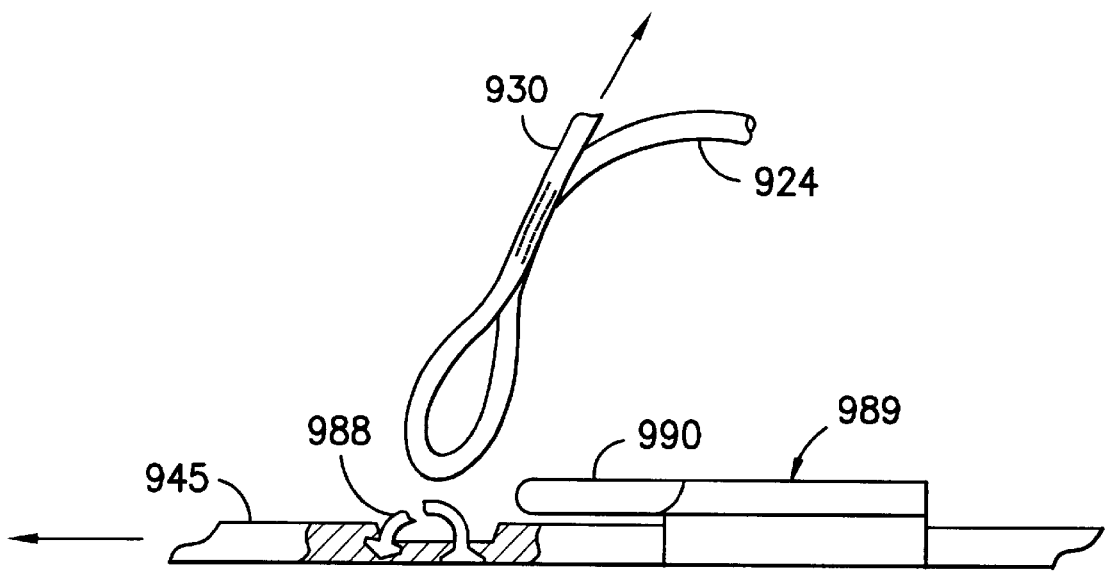
FIG. −11D−

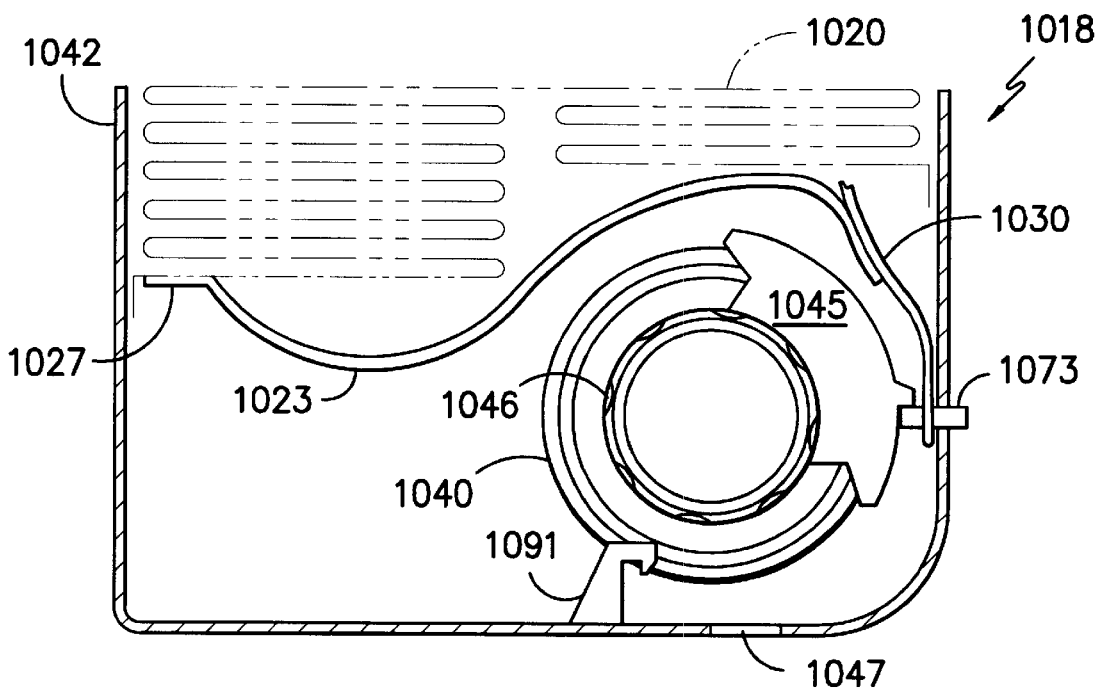
FIG. -12A-
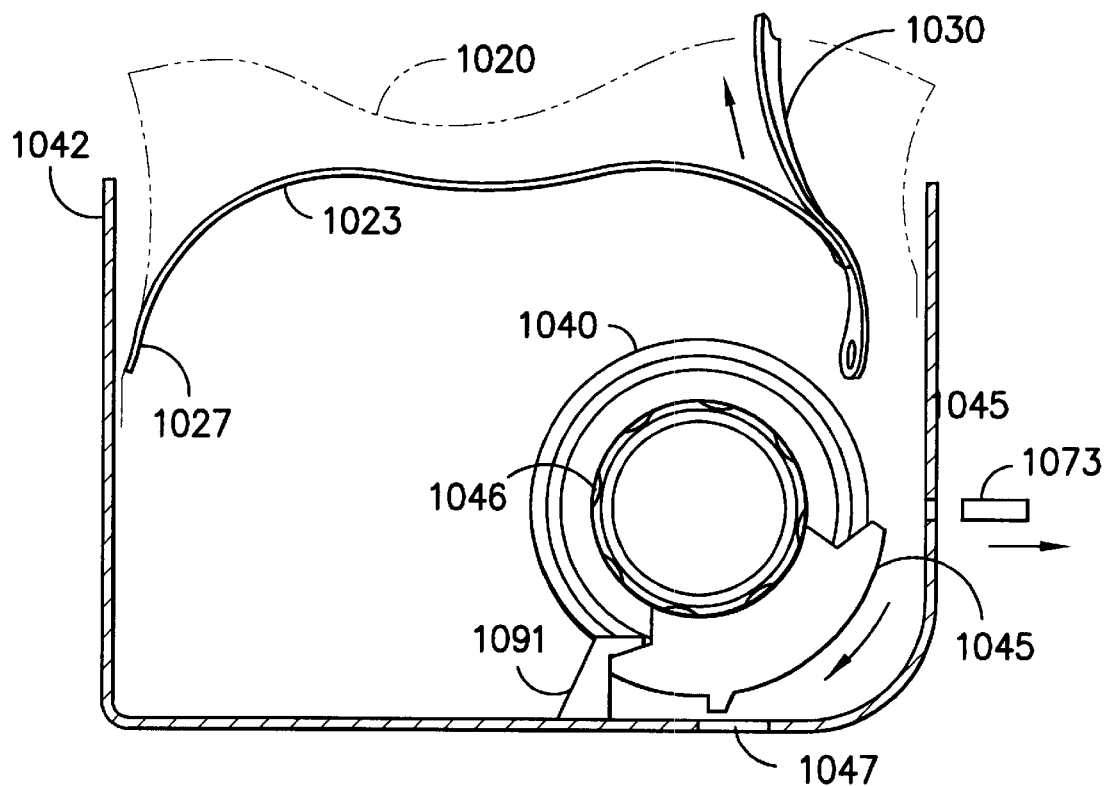
FIG. -12B-

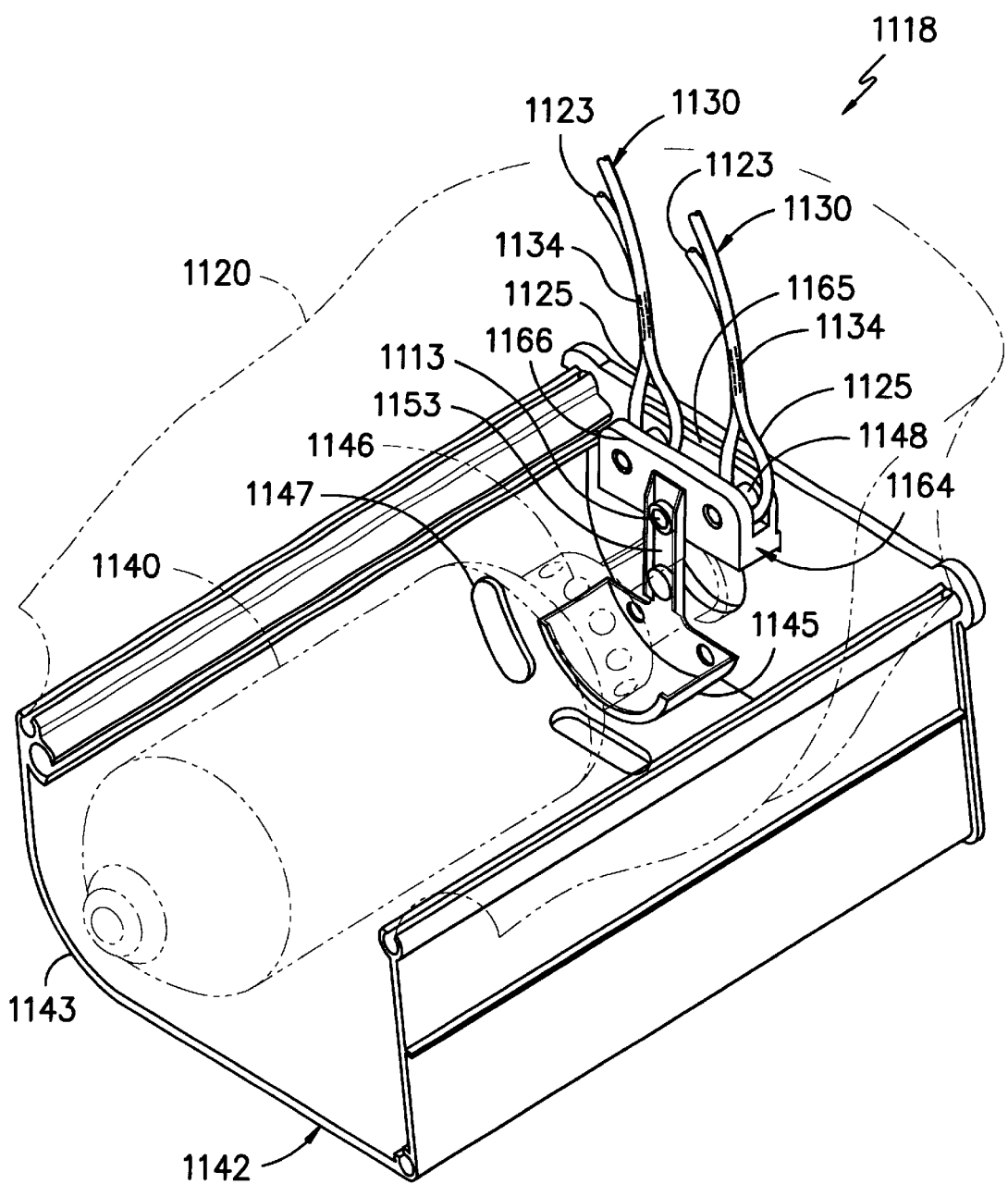
FIG. —13A—

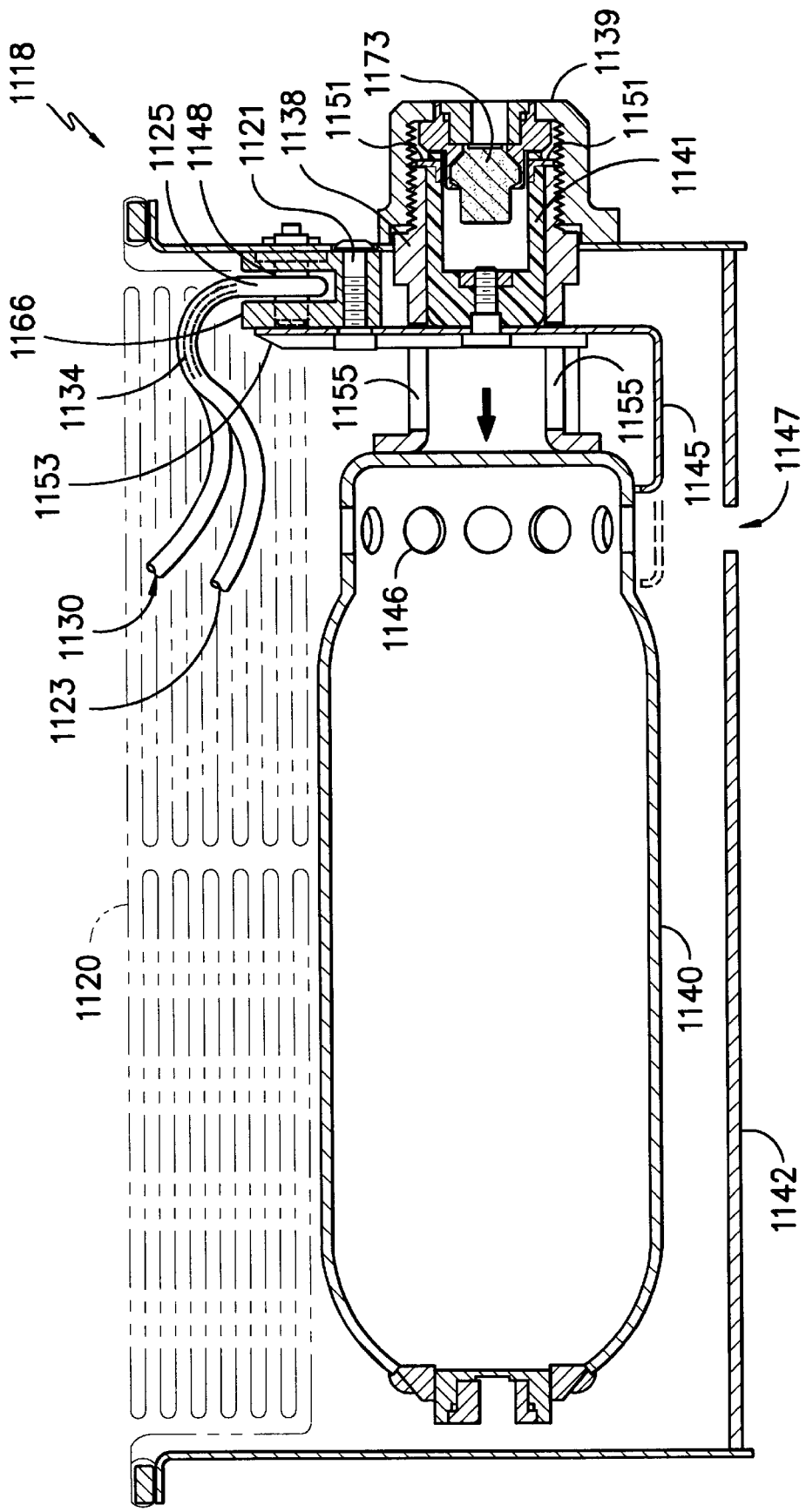
FIG. -13B-

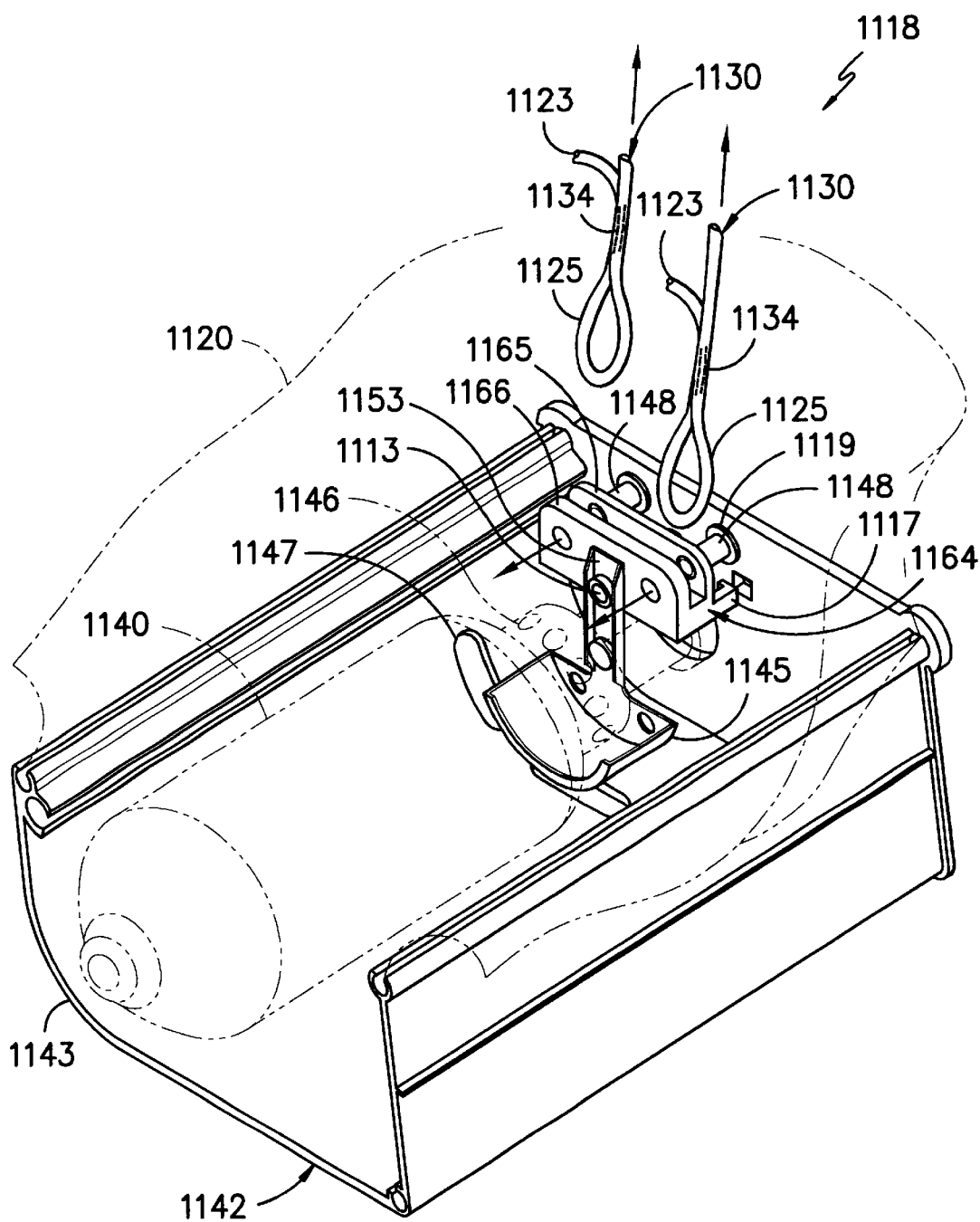
FIG. -13C-

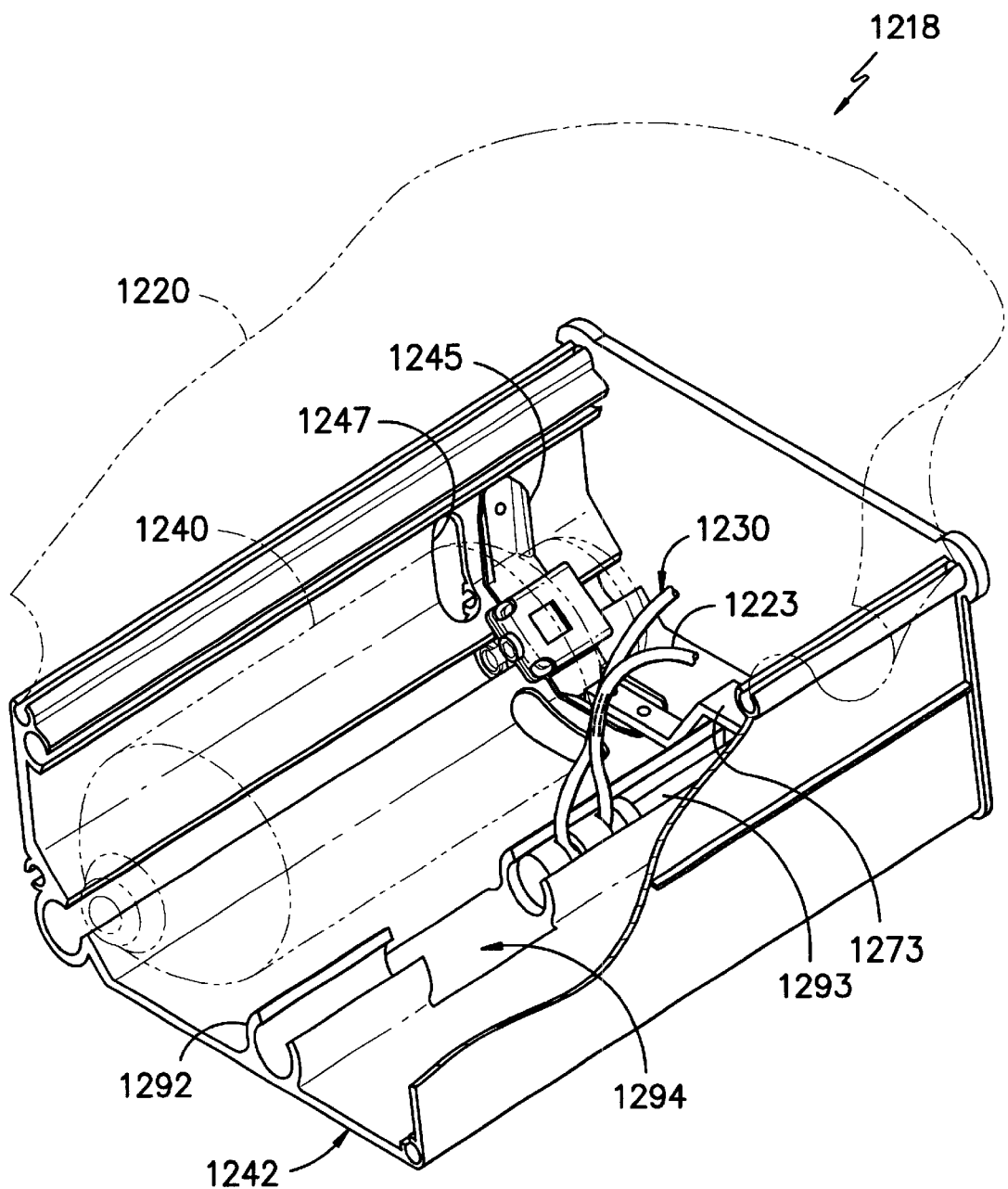
FIG. —14A—

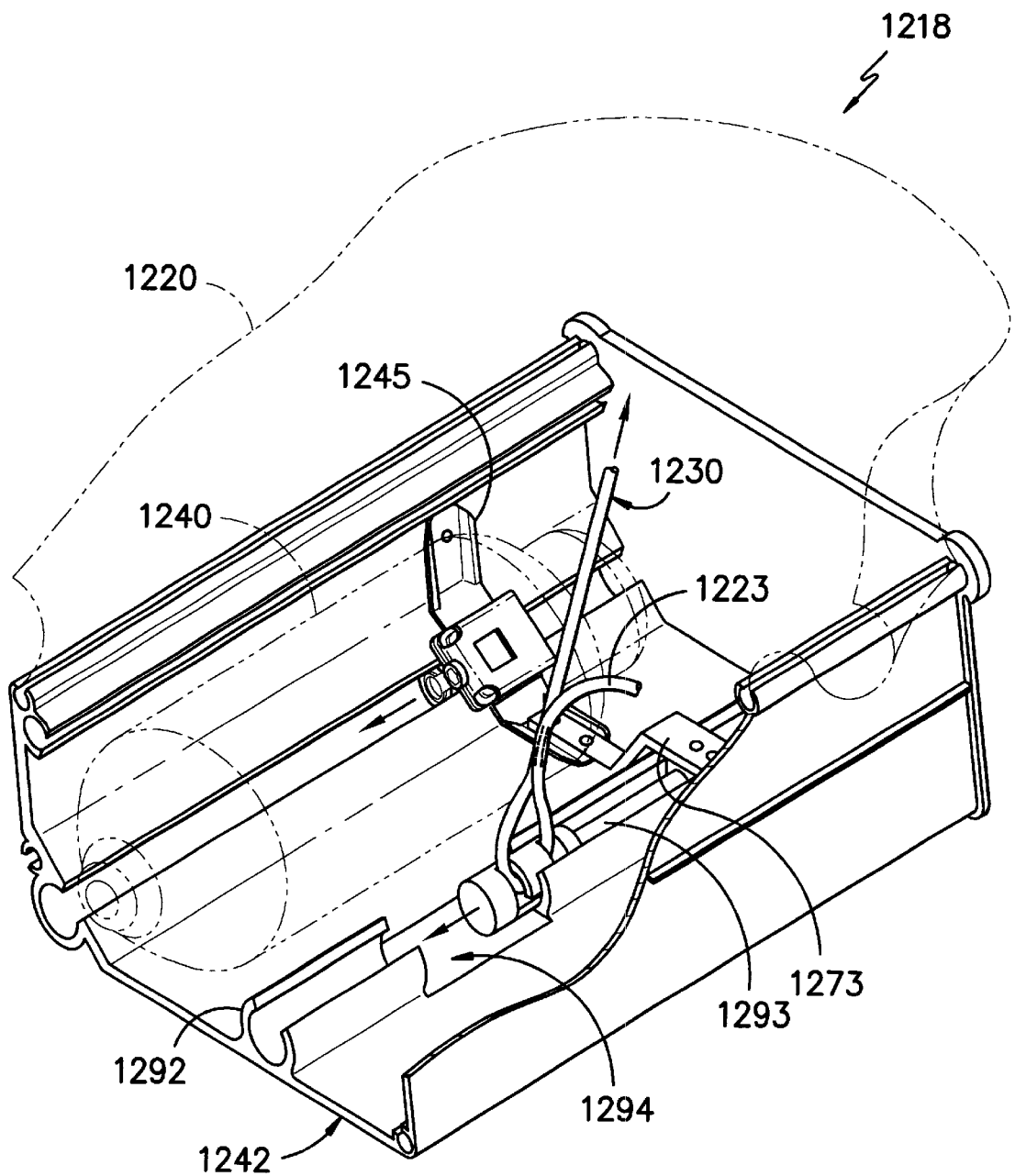
FIG. —14B—

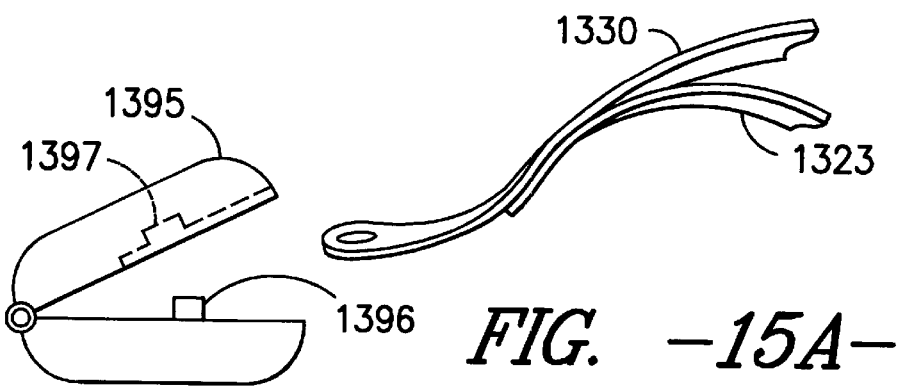
FIG. –15A–
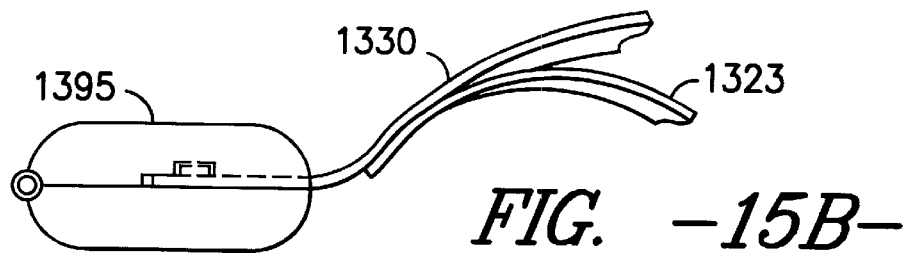
FIG. –15B–
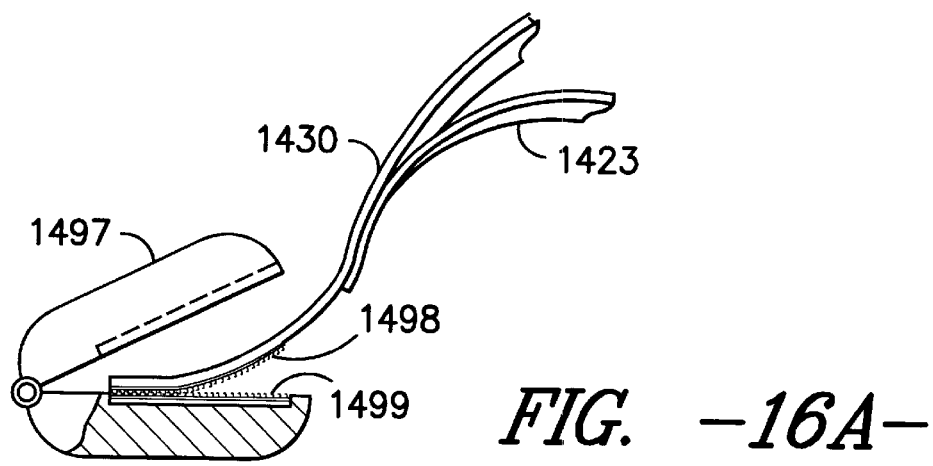
FIG. –16A–
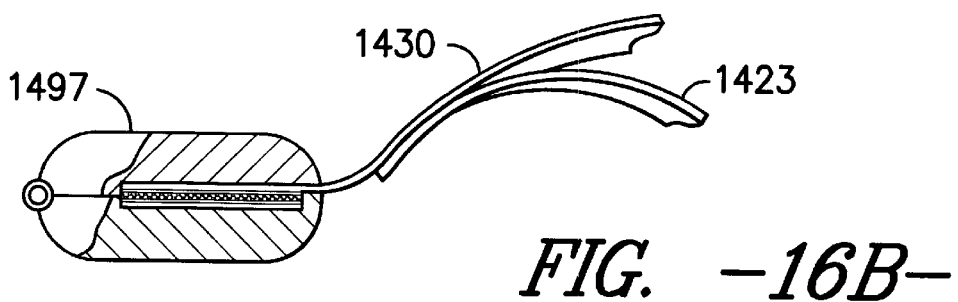
FIG. –16B–

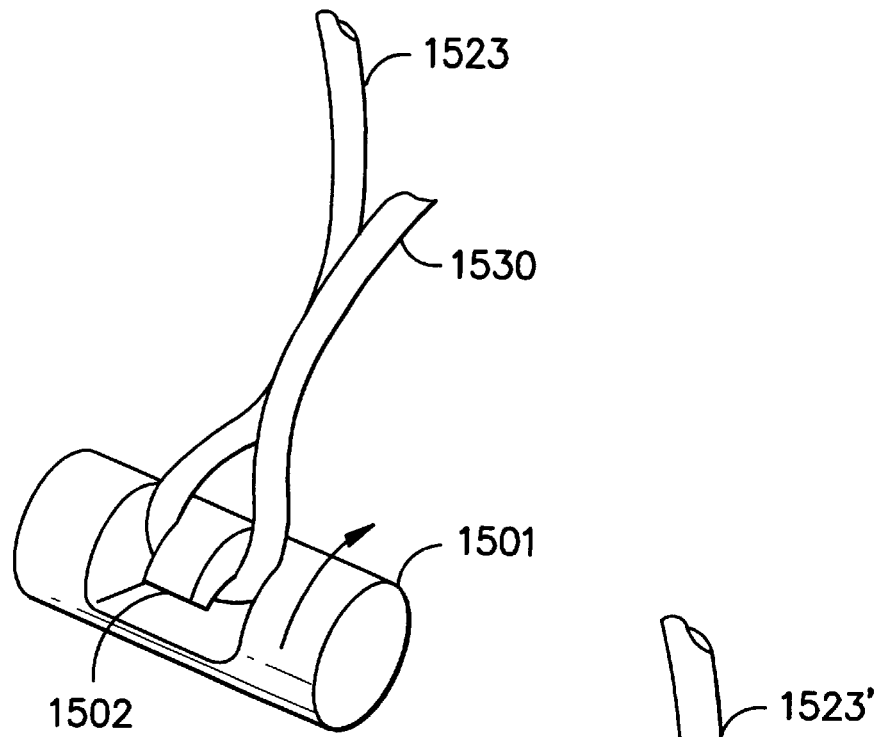
FIG. -17A-
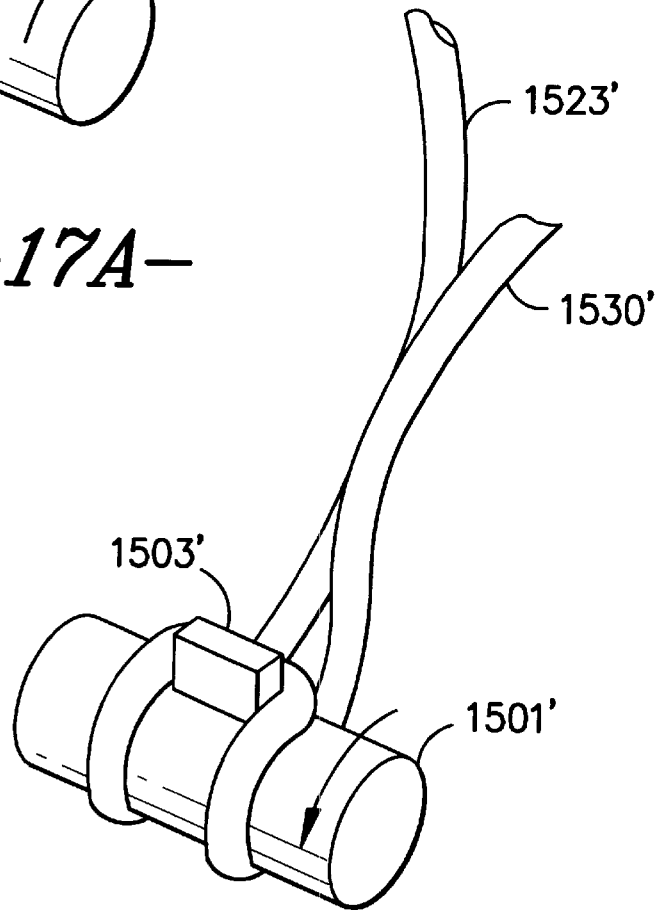
FIG. -17B-

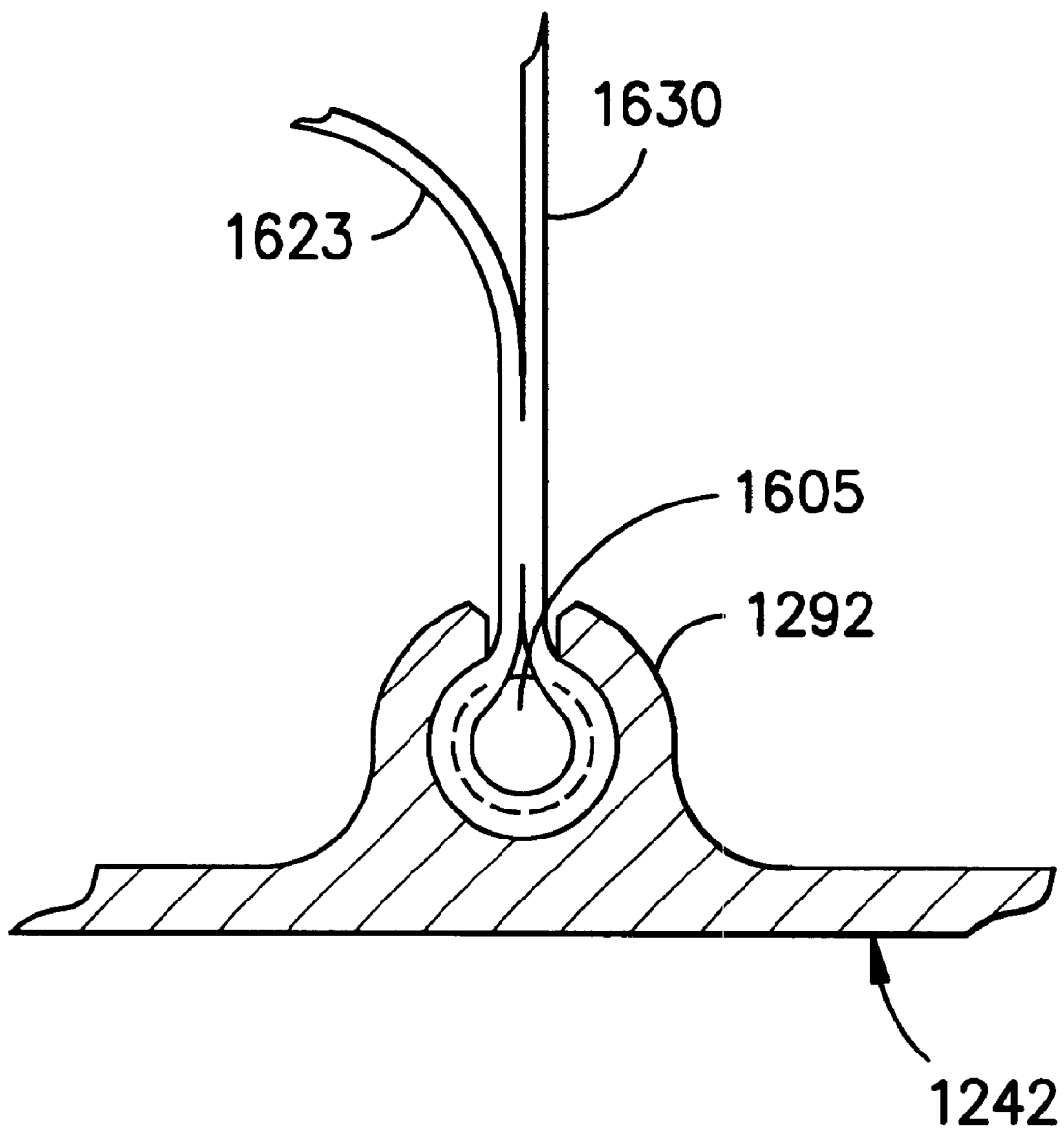
FIG. -18-

AIR BAG TETHER RELEASE ASSEMBLY

CROSS-REFERENCE TO RELATED APPLICATION

This application claims priority from U.S. Provisional Application No. 60/271,833 to Dunkle et al. having a filing date of Feb. 27, 2001.

TECHNICAL FIELD

This invention relates generally to an air bag assembly, and more particularly to an air bag assembly capable of variable expansion by selective retention or extension-inducing release of restraining tether elements.

BACKGROUND OF THE INVENTION

It is well known to provide an air bag assembly including an inflatable air bag cushion for protecting the occupants of a transportation vehicle. In an automotive vehicle such air bag assemblies are typically located within the hub of the steering wheel and in a recess in the instrument panel for protection of the vehicle occupants seated in opposing relation to such assemblies. Additional air bag assemblies may be located within the seats and/or door panels for protection of the occupants during a side-impact event.

Air bag assemblies typically include an inflatable cushion in fluid communication with a gas emitting inflator. Upon sensing certain predetermined vehicle conditions, such as a certain level of vehicle deceleration, the inflator discharges a fixed amount of inflator gas thereby forcing the air bag into a deployed position. The inflator gas occupies the available volume within the air bag cushion thereby forcing the air bag cushion to expand outwardly to the extent permitted by its construction. As the occupant comes into contact with the expanded air bag, the inflator gas is forced out of the air bag thereby dissipating the kinetic energy of the occupant.

Absent restraint, an inflated body tends to assume a generally spherical profile. In order to provide control over the inflated shape of the air bag cushion, it is known to utilize tethering elements in the form of straps or webs extending between surfaces of the air bag cushion to thereby hold the surfaces in fixed orientation relative to one another upon inflation. The selection and length of such tethering elements can thus be used to establish a desired inflated profile. However, once the tethering elements are attached in fixed relation to the surface of the air bag cushion, the inflated geometry of the cushion is likewise fixed and is not subject to adjustment.

It has been recognized that the preferred inflated profile of the air bag cushion may vary depending upon the severity of the activating impact event and/or upon the size and position of the occupant to be protected. Thus, the ability to effectively control the inflation characteristics of the air bag cushion is potentially desirable. In order to provide a degree of control over the inflated profile of the air bag cushion it is known to use an inflator that has varied levels or stages of inflator gas output in response to the sensing of different vehicle occupant conditions. Thus, it is generally known in the prior art to utilize so-called "dual-stage" inflators that discharge predetermined amounts of gas at one or two levels. However, these "dual-stage" inflators are more complex than typical inflators and have the limitation of typically providing only discrete levels of gas output. Moreover, the use of such "dual-stage" inflators provides control over only the amount of inflator gas which is discharged and does not provide control over the expanded geometry of the inflated air bag cushion. That is, due to the compressible nature of the inflation gas, so long as the air bag has a fixed volumetric capacity, the inflator gas will tend to fill that capacity and the expanded configuration of the air bag will be generally the same although the pressure may vary.

In order to provide an additional level of control over the air bag performance it has been suggested to utilize air bag cushions which incorporate sewn or woven in seams within the air bag to control the expanded geometry of the inflated air bag. Such seams separate upon the introduction of pressures exceeding a certain level thereby freeing the air bag cushion from the restraint imposed by the seams at lower pressures. In order for such break-away seams to provide controlled expansion, the introduction of such seams must be carried out with substantial precision such that seam separation will occur in a highly reproducible and predictable manner. In some instances, such requisite precision and reproducibility may be difficult to achieve. Moreover, even when such break-away seams are utilized, the expansion which occurs may be in all directions. In some applications it is believed that preferential expansion in the depth of the air bag (i.e. towards the occupant to be protected) may be desirable.

In order to address the desire to provide enhanced control over the final inflated profile of the air bag, it has been proposed to utilize release mechanisms to hold tether straps in place under normal conditions and to release the straps in situations where an extended profile is desired. Several of such release mechanisms are illustrated and described in U.S. Pat. No. 5,887,894 to Castagner et al. the contents of which are incorporated by reference as if fully set forth herein.

SUMMARY OF THE INVENTION

This invention provides advantages and alternatives over the prior art by providing a release mechanism of efficient construction and operation to hold restraining air bag tethers in place under a first set of predetermined conditions and to extend such tethers under a second set of predetermined conditions. The extension of the restraining tethers may be carried out in conjunction with the delivery of an increased volume of inflating gas to the air bag cushion. The air bag assembly may utilize a single stage inflator in conjunction with a variable inflation device to effect delivery of a proper volume of inflation gas.

BRIEF DESCRIPTION OF THE DRAWINGS

The present invention will now be described by way of example only, with reference to the accompanying drawings which constitute a part of the specification herein and in which:

FIG. 1 is a cut-away view of a vehicle interior showing an air bag cushion in a stored undeployed state in opposing relation to a vehicle occupant;

FIG. 2A is a view similar to FIG. 1 illustrating an air bag cushion in a deployed state restrained by an internal tether arrangement;

FIG. 2B is a view similar to FIG. 2A wherein the tether arrangement is released to a second restrained state to permit enhanced expansion of the air bag cushion towards a vehicle occupant;

FIG. 3A is an exploded perspective view of a variable inflation device and cooperative tether restraint assembly;

FIG. 3B is a cut-away side view of an air bag assembly incorporating the variable inflation device and cooperative tether restraint assembly illustrated in FIG. 3A;

FIG. 4A is an exploded perspective view of a variable inflation device and cooperative tether restraint assembly;

FIG. 4B is a cut-away side view of an air bag assembly incorporating the variable inflation device and cooperative tether restraint assembly of FIG. 4A;

FIG. 5A is an exploded perspective view of a variable inflation device and a cooperative tether restraint assembly;

FIG. 5B is a cut-away side view of an air bag assembly incorporating the variable inflation device and cooperative tether restraint assembly illustrated in FIG. 5A;

FIG. 6A is cut-away end view of an air bag module assembly incorporating a variable inflation device and a cooperating tether restraint assembly prior to activation of the variable inflation device;

FIG. 6B is a view similar to FIG. 6A following activation of the variable inflation device and corresponding release of a restrained tethering element to an increased operative length;

FIG. 7A is a view similar to FIG. 6A illustrating an alternative arrangement of a variable inflation device and cooperative tether restraint assembly prior to activation of the variable inflation device;

FIG. 7B is a view similar to FIG. 7A following activation of the variable inflation device and corresponding release of a restrained tethering element to an increased operative length;

FIG. 8A is a view similar to FIG. 6A illustrating a variable inflation device and a cooperative tether restraint assembly prior to activation of the variable inflation device;

FIG. 8B is a view similar to FIG. 8A following activation of the variable inflation device and release of a restraining tether from the tether restraint assembly to an increased operative length;

FIG. 9A is a view similar to FIG. 6A illustrating a variable inflation device and a cooperative tether restraint assembly prior to activation of the variable inflation device;

FIG. 9B is a view taken along line 9B—9B in FIG. 9A illustrating a tether holding hook arrangement;

FIG. 9C is a view similar to FIG. 9B illustrating an alternative tether holding hook arrangement;

FIG. 9D is a view similar to FIG. 9A following activation of the variable inflation device and release of the cooperative tether restraint assembly to an increased operative length;

FIG. 10A is an elevation exploded perspective view of a variable inflation device and a cooperative tether restraint assembly incorporating a side mounted slide;

FIG. 10B is a view of the side mounted slide in FIG. 10A in a tether restraining position;

FIG. 10C is a view similar to FIG. 10B with the side mounted slide in the tether release position;

FIG. 11A is an elevation exploded perspective view of a variable inflation device and a cooperative tether restraint assembly incorporating a side mounted slide;

FIG. 11B is a view of the side mounted slide in FIG. 11A in a tether restraining position;

FIG. 11C is a sectional side view taken through FIG. 11B;

FIG. 11D is a view similar to FIG. 11C with the side mounted slide in the tether release position;

FIG. 12A is cut-away end view of an air bag module assembly incorporating a variable inflation device and a cooperating tether restraint incorporating a rotating vent blocking element prior to activation of the variable inflation device;

FIG. 12B is a view similar to FIG. 12A following activation of the variable inflation device and corresponding release of a restrained tethering element to an increased operative length;

FIG. 13A is an elevation perspective view of an air bag assembly incorporating a cooperative tether release assembly and vent blocking element prior to activation;

FIG. 13B is a cross sectional view taken through FIG. 13A;

FIG. 13C is a view similar to FIG. 13A following activation and release of tethering elements to an increased operative length;

FIG. 14A is an elevation perspective view of an air bag assembly incorporating a cooperative tether release assembly and vent blocking element prior to activation;

FIG. 14B is a view similar to FIG. 14A following activation and release of tethering elements to an increased operative length;

FIGS. 15A and 15B illustrate a first exemplary moveable tether retaining element for use in the air bag assembly of FIG. 14A;

FIGS. 16A and 16B illustrate a second exemplary moveable tether retaining element for use in the air bag assembly of FIG. 14A;

FIGS. 17A and 17B illustrate respectively third and fourth exemplary moveable tether retaining elements for use in the air bag assembly of FIG. 14A; and FIG. 18 illustrates a fifth exemplary moveable tether retaining element for use in the air bag assembly of FIG. 14A;

While the invention has been illustrated and will hereinafter be described in connection with certain potentially preferred embodiments, procedures and practices, it is to be understood that in no event is the invention to be limited to such illustrated and described embodiments, procedures and practices. On the contrary, it is intended that the present invention shall extend to all alternatives and modifications as may embrace the principles of this invention within the true spirit and scope thereof.

DESCRIPTION OF THE PREFERRED EMBODIMENTS

Reference will now be made to the drawings, wherein to the extent possible, like reference numerals are utilized to designate like components throughout the various views. In FIG. 1 a vehicle 10 is shown including a seating structure 12 which supports an occupant 14 in generally opposing relation to an instrument panel 16. An air bag assembly 18 including an air bag cushion 20 is housed within the instrument panel 16 for outward deployment towards the occupant 14 in the event of a collision.

While the air bag assembly 18 and corresponding air bag cushion 20 are illustrated for descriptive purposes in relation to a vehicle passenger, it is to be understood that the present invention is in no way to be limited to a passenger side configuration. On the contrary, it is contemplated that the present invention may have applicability to air bag deployment in opposing relation to the operator (not shown) of the vehicle 10 as well as in relation to air bags deployed from other regions within the vehicle interior.

It is contemplated that the vehicle 10 may include a seat position sensor 22 to detect the position of the occupant 14 relative to the air bag assembly 18. It is further contemplated that the vehicle 10 may include additional position sensors such as an optical scanner 24 or the like to measure both the volume and position of the occupant to be protected. The vehicle 10 may also be provided with a scale 26 within the seating structure 12 so as to provide additional data regarding the load to which the inflatable air bag cushion 20 may be subjected upon impact by the occupant 14. It is additionally contemplated that the seating structure 12 may be provided with sensing elements to measure the degree to which the seating structure is reclined. The vehicle 10 may also be provided with sensors to determine and communicate whether or not the occupant is utilizing the recommended seat belt structures 28.

The data so collected may be utilized to determine the desirable expanded profile characteristics for the air bag cushion 20 in a given situation.

It is contemplated that the air bag cushion 20 has a first expanded profile which is obtained upon full extension of internal tethering elements 30 and at least a second expanded profile which is characterized by less depth than the first expanded profile. As best illustrated through simultaneous reference to FIGS. 2A and 2B, it is contemplated that one or more tethering elements 30 in the form of straps extending from locations at the interior of the air bag cushion 20 are utilized to control the inflated profile of the air bag cushion 20. The tethering elements 30 are normally held in fixed relation between connection points 29 at the interior of the cushion and a releasable restraint assembly 36 in the vicinity of a gas generating inflator 40. This releasable attachment may be effected by use of an integral or supplemental sliding loop structure 25 although it is contemplated that any number of other arrangements may likewise be utilized.

As shown in FIG. 2A under normal operating conditions, the tethering elements 30 restrain the profile of the expanding air bag cushion 20 to a first diminished depth. By way of example only, and not limitation, it is contemplated that such a restrained profile may be of particular use in the protection of smaller stature occupants and/or occupants seated in close proximity to the instrument panel 16. As shown in FIG. 2B, in instances where a larger profile is desired, the tethering elements 30 may be released from the restraint assembly 36 thereby yielding a permissible expanded geometry of expanded depth. In the event that the tethering elements 30 are released from the restraint assembly, it is contemplated that some degree of restraint may nonetheless be maintained by a length extending tether extension 23 such as a strap or the like operatively connected between the tethering elements and a secondary attachment location 27 which may be either on the surface of the air bag cushion or at an external location. By way of example only, and not limitation, it is contemplated that such an expanded depth may be particularly useful in the protection of larger stature occupants and/or in the protection of occupants seated a substantial distance away from the instrument panel 16.

As will be appreciated, upon the release of the tethering elements 30 from the restraint assembly 36, the volume of the air bag is increased. According to a potentially preferred practice, the air bag assembly 18 incorporates a selectively activatable variable inflation device which causes more or less inflation gas to be delivered to the air bag cushion depending upon the desired inflation characteristics. That is, the variable inflation device will deliver a greater quantity of inflation gas to the air bag cushion 20 in instances where a deep profile such as is illustrated in FIG. 2B is desired. Conversely, in instances where a more shallow inflated profile is desired such as illustrated in FIG. 2A, a smaller quantity of inflation gas is released into the air bag cushion 20.

According to a first exemplary practice, the variable inflation device incorporates a sliding vent blocking element which may be moved from a first position to a second position so as to either open or close a vent opening within the air bag assembly 18 thereby adjusting the volume of inflation gas passing from the inflator 40 into the air bag cushion 20. This opening or closing may be either partial or complete. By way of example only, and not limitation, one such variable inflation device is illustrated and described in U.S. Pat. No. 6,123,358 to Ryan et al. the contents of which are incorporated by reference as if fully set forth herein. It is contemplated that the action of the vent blocking element will simultaneously increase the volume of the inflation gas entering the air bag cushion and disengage the tether elements 30 from the restraint assembly 36 so as to extend the operative length of the tether element such that an enhanced volume of inflation gas is selectively delivered to the air bag cushion 20 in conjunction with the operative extension of the tether elements 30.

In FIGS. 3A and 3B there is illustrated a first arrangement for a cooperative tether extension assembly and variable inflation device wherein elements corresponding to those previously described are designated by like reference numerals in a 100 series. As illustrated, in this arrangement a tethering element 130 is passed through the interior of a loop element 132 of a generally pliable material such as fabric or the like of high tensile strength. The configuration of the loop element 132 and the tethering element 130 is thereafter maintained by attaching surfaces of the folded tethering element 130 to one another by stitching 134 or other attachment techniques such as adhesives and cooperating hook and loop elements as will be well known to those of skill in the art at a location remote from the loop element 132. While only a single tethering element 130 is illustrated, it is to be appreciated that multiple tethering elements may be incorporated if desired. A portion of the tethering element 130 extending away from the loop element 132 forms a length extending tether extension 123 which may be anchored in fixed or releasable relation to an anchor point (not shown) such as a stitched attachment to the interior or exterior surface of the air bag cushion. This length extending tether extension 123 acts as a mooring line to provide a secondary tethering restraint when the loop element 132 is released in the manner as will now be described.

As illustrated, the cooperative assembly includes an end cap 133 which preferably has a configuration generally corresponding to the cross-sectional geometry of an inflator housing 142 supporting the gas generating inflator 140 (FIG. 3B). The end cap 133 preferably includes an aperture 135 extending therethrough. The aperture 135 is sized to accept a squib-containing head portion 136 of a dynamic variable inflation device 137. A head cap 138 covers the head portion 136 following assembly. As shown, the variable inflation device 137 includes a slideable vent blocking plate 145 which is normally disposed out of alignment with gas emitting openings 146 within the inflator 140.

In instances where a lower volume of inflation gas is desired within the air bag cushion 120, the vent blocking plate remains out of alignment with the gas emitting openings 146 and a substantially unrestricted gas transmission path is thereby present between the gas emitting openings 146 and an aligned housing opening 147 thereby permitting a portion of the inflation gas to pass outwardly from the housing 142 rather than entering the air bag cushion 120. As shown in dotted lines, upon activation of the variable inflation device 137 the vent blocking plate 145 is moved over the gas emitting openings 146. In this covering position, the vent blocking plate 145 at least partially blocks the gas travel path between the gas emitting openings 146 and the housing opening 147 thereby causing an increased volume of inflation gas to be directed into the air bag cushion 120.

Preferably, the movement of the vent blocking plate 145 may also be used to release the tethering element 130 from fixed attachment within the housing 142 thereby permitting the air bag cushion 120 to assume an expanded inflated configuration as illustrated in FIG. 2B. In the embodiment illustrated in FIGS. 3A and 3B, the end cap 133 includes one or more extended pin elements 148 which project outwardly in the direction of movement of the vent blocking plate 145 (i.e. towards the gas emitting openings 146). During assembly, the loop element 132 attached to the tethering element 130 is passed over the pin elements 148 and held in place by an opposing wall 149 of the vent blocking plate 145. As best seen in FIG. 3A, the wall 149 of the vent blocking plate preferably includes notched channels 150 for acceptance of cooperating pin elements 148 on either side of the end plate aperture 135. Thus, a loop element 132 attached to a corresponding tethering element 130 may be passed over one or both pin elements 148 and thereafter be held in place between the end cap 133 and the opposing wall 149 of the vent blocking plate 145.

In operation, when the variable inflation device 137 is activated, the vent blocking plate 145 moves away from the end cap 133 and towards the gas emitting openings 146. This action also causes the wall 149 of the vent blocking plate to move away from the end cap 133 thereby permitting the loop element 32 and attached tethering element 130 to slide over and away from the pin elements 148 as outward tension is applied. This sliding removal may be facilitated by the lower edge of the pin elements 148 being angled upwardly as shown. In some instances, the sliding removal may be facilitated still further by use of leaf spring elements 152 which include notched channels to engage the underside of the pin elements 148 forward of the loop elements 132. The leaf spring elements 152 are arranged to normally apply a biasing force in the direction of movement of the vent blocking plate 145. Thus, by placing the loop element 132 between the leaf spring elements 152 and the wall 149 of the vent blocking plate 145, the leaf spring elements 152 will serve to push the loop elements 132 away from the pin elements 148 once the vent blocking plate 145 is moved away from the pin elements 148.

In FIGS. 4A and 4B, there is illustrated another tether release assembly in cooperative arrangement with a dynamic variable inflation device. Elements corresponding to those previously illustrated and described are designated by corresponding reference numerals in a 200 series. As shown in FIG. 4A, in this embodiment, the tethering element 230 is preferably passed in loop forming fashion through a clip element 256. The tethering element 230 is held in fixed relation to the clip element by stitching 234 or other suitable attachment systems as will be known to those of skill in the art. As shown, the clip element 256 is of a split construction including a pair of flexible distending legs 257 with outwardly projecting hooks on the legs 257. As illustrated, the legs 257 are separated from one another by a channel 258 opening into a wider circumference base portion 259. A portion of the tethering element 230 extending away from the clip element 256 forms a length extending tether extension 223 which may be anchored in fixed or releasable relation to an anchor point (not shown) such as a stitched attachment to an internal or external surface of the air bag cushion. In operation, this length extending tether extension 123 acts as a mooring line to provide a secondary tethering restraint when the loop element clip element 256 is released in the manner as will now be described.

The material forming the clip element 256 is preferably a plastic material having sufficient rigidity to retain its overall shape while nonetheless permitting the legs 257 to bend inwardly and outwardly to some degree. The clip element 256 is dimensioned such that the legs 257 may pass in substantially free sliding relation through the interior of a box channel element 260 projecting outwardly from the end cap 233. The box channel element 260 preferably includes an acceptance opening 261 for introduction of a spreading pin 262 which is carried on the variable inflation device 237 and moves in conjunction with the vent blocking plate 245. Upon assembly, the clip element 256 is passed into the box channel element 260 such that the base portion 259 is substantially in alignment with the acceptance opening 261 of the box channel element. The spreading pin 262 is thereafter inserted through the acceptance opening 261 and into the base portion 259 of the clip element 256. The dimensions of the spreading pin 262 are preferably such that the legs 257 are caused to spread apart so as to hook below the lower edges of the box channel element. If desired, the end of the spreading pin 262 may be tapered thereby facilitating smooth insertion.

In operation, upon activation of the variable inflation device and corresponding movement of the vent blocking plate 245 away from the end cap 233, the spreading pin 262 is withdrawn from engagement with the clip element 256 thereby permitting the legs 257 to pull inwardly and disengage from hooked relation beneath the box channel element 260. The tethering element 230 can thereby be pulled away from the stationary box channel element 260 as the air bag cushion 220 undergoes increased expansion.

Another assembly for the retention and release of an air bag tethering element in conjunction with variable inflation control is illustrated in FIGS. 5A and 5B wherein elements corresponding to those previously illustrated and described are designated by reference numerals corresponding to those previously used in a 300 series. As shown in FIGS. 5A and 5B, the air bag assembly includes a tethering element 330 in adjoined relation to a loop element 332 as in the embodiments of FIGS. 3A and 3B. The variable inflation device 337 carries an upwardly extending forked extension 364 including a first upright bar 365 which is carried on the variable inflation device 337 and which moves in conjunction with the vent blocking plate 345. The forked extension 364 further includes a second upright bar 366 located forward of the first upright bar 365 (i.e. further away from the gas emitting openings 346) and a cross bar 367 connecting the first and second upright bars 365, 366.

As illustrated, the orientation of the forked extension 364 is preferably such that upon assembly the first and second upright bars are disposed between outboard pin elements 348 such as described in relation to the embodiments in FIGS. 3A and 3B. Due to the pliable nature of the material forming the loop element 332, the loop element 332 may be passed in a generally sine wave configuration around the exterior of the outboard pin elements 348 and over the cross bar 367 between the first and second upright bars 365, 366 in the manner illustrated in FIG. 5B. Thus, the loop element 332 is secured against slippage away the outboard pin elements 348 prior to activation of the variable inflation device 337.

Upon activation of the variable inflation device 337, both the vent blocking plate 345 as well as the forked extension 364 are moved away from the end cap 333 and the stationary pin elements 348. During this movement, the second upright bar 366 pushes the loop element 332 over the ends of the pin elements 348. Once the pin elements 348 have been cleared, the loop element is no longer restrained by either the pin elements 348 or by the forked extension 364. Thus, the loop element 332 and the attached tethering element 330 are thereafter free to move away from the inflator 340 as the air bag cushion 320 expands outwardly.

In addition to assemblies which utilize vent blocking plates which slide in axial relation to the inflator, it is likewise contemplated that release assemblies may incorporate attachment assemblies and cooperating vent blocking elements which move in substantially transverse relation to the inflator within a housing. A cut-away end view of an assembly incorporating a vent blocking element which is movable at substantially right angles to an elongate gas generating inflator is illustrated in FIGS. 6A and 6B wherein elements corresponding to those previously illustrated and described are designated by like reference characters in a 400 series.

As shown in FIG. 6A, the air bag assembly 418 includes an elongate gas generating inflator 440 similar to those illustrated in previous embodiments arranged within a housing 442. Extending across the housing at generally right angles to the inflator 440 is a vent blocking plate 445. The vent blocking plate 445 includes one or more localized vent openings 468 which are normally disposed in alignment with corresponding vent openings 447 within the housing 442. A tethering element 430 is attached to a locking tab element 469 secured in fixed opposing relation to a distal end of the vent blocking plate 445. As illustrated, the locking tab element 469 preferably includes an outwardly projecting hooked prong 470 which is engageable through an opening in a mating stationary clip element 471. If desired, a guide channel element 472 may be located adjacent to the mating clip element 471 to facilitate the travel of vent blocking plate 445 towards the hooked prong 470 in the manner to be described.

In operation when enhanced volume is not required, the vent blocking plate 445 remains in a substantially stationary position such that a portion of the inflation gas emitted by the inflator 440 is expelled outwardly through the aligned vent openings 447, 468. In the event that the crash severity and/or the size or position of the occupant to be protected indicates that an enhanced inflation profile is desirable, then a pressure generating squib 473 which may also be referred to as an initiator, may be activated thereby causing a pressure wave to move against the proximal end of the vent blocking plate 445 and pushing the vent blocking plate 445 away from the squib 473 and towards the opposing side wall of the housing 442. Upon movement of the vent blocking plate 445, the vent opening 468 within the vent blocking plate 445 moves out of alignment with the vent opening 447 in the housing as shown in FIG. 6B. Thus, the gas transmission path out of the housing is closed thereby forcing a greater quantity of inflation gas into the air bag cushion 420. In addition, the forward movement of the vent blocking plate 445 causes compression of the hooked prong 470 towards the body of the locking tab element 469 thereby causing the hooked prong 470 to disengage from the mating clip element 471. It is contemplated that this disengagement may be effected by either pushing the hooked prong 470 back through the mating clip element or by simply sheering the mating clip element off such that the locking tab element 469 is thereafter free to move away from the housing as illustrated in FIG. 6B. A degree of tethering restraint is preferably nonetheless maintained by length extending tether extension 423 which may be anchored in fixed or releasable relation to an anchor point such as a stitched attachment point 427 at an internal or external surface of the air bag cushion 420.

As shown, the distal end of the vent blocking plate 445 may have an angle substantially complementary with the angle of the hooked prong 470. Such mating angles may promote efficient contacting relation between the hooked prong 470 and the moving vent blocking plate 445. While a single hooked prong 470 is illustrated, it is to be understood that the locking tab element 469 may incorporate a number of prongs along its length so as to facilitate additional stability if desired.

In FIGS. 7A and 7B, a cut-away end view similar to FIGS. 6A and 6B is provided illustrating another tether release assembly for use in conjunction with a variable inflation device within an air bag housing. In this embodiment like elements to those previously described are designated by like reference numerals in a 500 series. As shown, in this embodiment the tethering element 530 is attached to an elongate ring structure 575 which in turn is attached in frangible relation to a stationary base anchor element 576 held within a confinement chamber 577 along one side of the housing 542. The tethering element 530 is thus normally held in locked relation by the elongate ring structure 575 and cooperating base anchor element 576 as shown in FIG. 7A.

In instances when an enhanced expanded air bag profile is desired, the pressure generating squib or initiator 573 is fired thereby forcing the distal end of the vent blocking plate 545 forward and causing the elongate ring 575 to sheer away from the locked base anchor element 576. As shown, this sheering operation releases the tethering element 530 thereby allowing movement away from the stationary base anchor element 576 and the housing 542. A degree of tethering restraint is preferably nonetheless maintained by length extending tether extension 523 which may be anchored in fixed or releasable relation to an anchor point such as a stitched attachment point 527 to an internal or external surface of the air bag cushion 520.

As shown, the elongate ring 575 may include an internal bridging element 578 to prevent detachment from the tether element 530. During the sheering operation the vent openings 568 within the vent blocking plate 545 are moved out of alignment with the vent openings 547 within the housing thereby causing a greater percentage of inflation gas to be directed into the air bag cushion 520 in the manner as previously described in relation to other embodiments.

In FIGS. 8A and 8B there is illustrated in cut-away end view yet another arrangement for selective retention of an air bag tethering element. In this embodiment, elements corresponding to those previously illustrated and described are designated by like reference numerals in a 600 series. As shown, the air bag assembly 618 includes a tethering element 630 which is attached to a pin element 678. The pin element 678 extends through a stationary mating sleeve 679. One or more frangible sheer tabs 680 extend between the pin element 678 and the sleeve 679. As shown, the orientation of the pin element 678 within the sleeve 679 is in generally opposing relation to the distal end of the vent blocking plate 645. Thus, upon movement of the vent blocking plate 645 by the pressure generating squib or initiator 673, the pin element 678 is pushed out of the sleeve 679 as the sheer tabs 680 are broken off. Concurrently, the vent openings 647 and 668 become misaligned thereby increasing the percentage of inflation gas which may enter the inflatable cushion 620

(FIG. 8B). Following disengagement from the sleeve 679 the pin element 678 and attached tether element 630 are thereafter free to move away from the stationary sleeve 679 and the housing 642 in conjunction with the inflation of the air bag cushion 620. A degree of tethering restraint is preferably nonetheless maintained by length extending tether extension 623 which may be anchored in fixed or releasable relation to an anchor point such as a stitched attachment point 627 to an internal or external surface of the air bag cushion 620.

In FIGS. 9A–9D there is illustrated yet another arrangement for the selective retention and release of an air bag tethering element. In this embodiment, elements corresponding to those previously illustrated and described are designated by like reference numerals in a 700 series. In this arrangement, the air bag assembly 718 incorporates a vent blocking plate 745 including a hook-forming distal end which moves in substantially transverse relation to the inflator 740. The tether element 730 is formed into a loop at one end and passed over a fixed anchoring hitch element 781 projecting in the direction of travel of vent blocking plate 745. As best seen in FIG. 9B, the vent blocking plate 745 includes a generally "C" shaped hook 782 at the distal end. As illustrated, the hook 782 holds the tether element 730 on the hitch element 781 until it is moved away by firing the squib or initiator 773. In this orientation, the tethering element 730 is prevented from moving away from its anchored position thereby constricting the available inflation diameter of the overlying air bag cushion 720 to which the tethering element 730 is operatively connected. While a substantially straight sided "C" shaped hook 782 may be utilized to hold the tethering element 730 in place, it is also contemplated that other geometries such as a reverse "L" opening 782' as shown in FIG. 9C may likewise be utilized to further enhance ability of the vent blocking plate 745' to hold the tether in place prior to activation.

As best seen in FIG. 9D, when the vent blocking plate is advanced, the tethering element 730 is pushed off of the end of the anchoring hitch element 781 and is thereafter free to move out of the gap within the hook 782, 782' and away from the housing 742 as the air bag cushion 720 expands. A degree of tethering restraint is preferably nonetheless maintained by length extending tether extension 723 which may be anchored in fixed or releasable relation to an anchor point such as a stitched attachment point 727 to an internal or external surface of the air bag cushion 720. Concurrently with the release of the tethering element, the vent opening 747 within the housing 742 is at least partially closed off thereby directing an enhanced percentage of inflation gas into the air bag cushion 720.

In FIGS. 10A, 10B, and 10C, there is illustrated yet another arrangement for the selective retention and extension inducing release of an air bag tethering element. In this embodiment, elements corresponding to those previously illustrated and described are designated by corresponding reference numerals within an 800 series. As illustrated, in this embodiment, the vent blocking plate 845 is arranged along one side wall of the housing 842 within a support channel 883 as shown. Such a side arrangement is illustrated in U.S. Pat. No. 6,161,866 to Ryan et al. the teachings of which are incorporated by reference as if fully set forth herein. As shown, in this embodiment a stationary pin element 848 extends away from the side wall of the housing 842 within the boundaries of the support channel 883. A looped end of a tethering element 830 is disposed over the pin element 848. A portion of the tethering element 830 extending away from the pin element 848 forms a length extending tether extension 823 which may be anchored in fixed or releasable relation to an anchor point (not shown) such as a stitched attachment to the interior or exterior surface of the air bag cushion.

The pin element 848 may be angled upwardly if desired so as to facilitate the sliding disengagement of the tethering element 830 upon application of a tensioning force. A break-away attachment strip 884 may be used to hold the tethering element 830 in a substantially planar relation to the side wall if desired. The side wall of the housing 842 also includes an opening 847 within the boundaries of the support channel 883. The vent blocking plate 845 includes a key slot 885 extending from the upper edge into the interior of the vent blocking plate 845. As illustrated, the key slot 885 includes a nose projection 886 projecting in the direction of sliding movement by the vent blocking plate 845. The vent blocking plate 845 also includes a vent opening 868 as shown.

As best seen through simultaneous reference to FIGS. 10A–10C, upon assembly, the pin element 848 is disposed within the nose portion 886 of the key slot 885 with the portion of the tethering element extending away from the pin element 848 being held behind the vent blocking plate 845 between the side wall and the vent blocking plate (FIG. 10B). In this normal configuration, the vent openings 847 and 868 within the side wall and vent blocking plate are substantially aligned such that a portion of inflation gas emitted from the gas emitting openings 846 is carried outwardly from the housing 842. In operation, the arrangement as illustrated in FIG. 10B is maintained for deployment of air bag cushions under circumstances where a shallow restrained profile is desired. In that arrangement, the tethering element 830 is secured against movement away from the pin element 848 by the overlying portion of the vent blocking plate 845.

In the event that a release of the tethering element 830 is desired, an initiator or squib 873 is fired thereby projecting the vent blocking plate 845 in sliding relation through the support channel 883 until contacting a stop pin 887 (FIG. 10C). As shown, the forward movement of the vent blocking plate 845 causes the nose portion 886 to be displaced relative to the stationary pin element 848 thereby bringing the pin element 848 into alignment with an open portion of the key slot 885. In this arrangement, the tethering element 830 is no longer held beneath the sliding vent blocking element and is thereby free to slide off of the pin element 848 as shown. In addition to the release of the tethering element 830, the sliding movement of the vent blocking element 845 also results in the substantial misalignment of the vent openings 847, 868 thereby closing off the gas transmission path through the housing 842 and causing a greater percentage of inflation gas to be directed into the air bag cushion.

In FIGS. 11A–11D, there is illustrated still another arrangement for the selective retention and release of a tethering element. In this embodiment, elements corresponding to those previously illustrated and described are designated by like reference numerals in a 900 series. As shown in FIG. 11A, in this assembly a sliding vent blocking plate 945 is arranged in sliding relation within a support channel 983 extending along a side wall of the housing 942. The vent blocking plate 945 may be moved within the support channel by activation of a squib 973 or other initiator. As best seen in FIGS. 11C and 11D, a looped end of a tethering element 930 is attached to the vent blocking plate 945 by a breakable attachment element 988 such as a piece of plastic fixed in a loop-forming fashion to the surface of the vent blocking plate 945. The tethering element 930 is further held in place by a stationary clip element 989 which is mounted to the side wall of the housing. As shown, the stationary clip element 989 includes a narrow finger projection 990 which projects away from the body of the clip element in the direction of movement of the vent blocking plate 945. As shown, the vent blocking plate also includes a vent opening 968 which may be aligned with a corresponding vent opening 947 within the housing 942.

Upon assembly, the finger projection 990 is arranged to extend through the looped end of the tethering element 930 in overlying relation to the breakable attachment element 988 (FIG. 11C). In this configuration, the finger projection 990 supports the tethering element 930 against outward movement. In this restrained arrangement, the vent openings 968 and 947 are preferably substantially aligned as shown in FIG. 11B thereby permitting a portion of the inflation gas emitted by the inflator 940 to be discharged through the housing 942 without entering an overlying air bag cushion.

In the event that release of the tethering element 930 is desired, the squib 973 is fired thereby projecting the vent blocking plate 945 in sliding relation in the direction of the stationary finger projection 990. Upon the occurrence of such movement, the breakable attachment element 988 pulls the tethering element 930 out of engagement with the finger projection 990 as shown in FIG. 11D. However, once disengagement from the finger projection is effected, the strength of the breakable attachment element 988 is insufficient to retain the tethering element 930 in place and the tethering element 930 is thereby released from its previous attachment at the vent blocking plate 945. As illustrated, the movement of the vent blocking plate also results in the misalignment of the vent openings within the vent blocking plate and housing thereby causing a greater percentage of inflation gas to be directed into the overlying air bag cushion as increased expansion takes place. According to the illustrated arrangement, a portion of the tethering element 930 extending away from the loop forms a length extending tether extension 923 which may be anchored in fixed or releasable relation to an anchor point (not shown) such as a stitched attachment to the interior or exterior surface of the air bag cushion so as to nonetheless maintain a degree of tethering restraint.

In FIGS. 12A and 12B, there is illustrated still another arrangement for the selective retention of a tethering element. In this embodiment, components corresponding to those previously illustrated and described are designated by like reference numerals in a 1000 series. In this embodiment the air bag assembly 1018 (shown in cut-away end view) includes an elongate inflator 1040 such as illustrated in FIGS. 10A and 11A arranged along the length of a housing 1042. A rotatable vent blocking element 1045 having a generally cupped configuration is arranged over the neck portion of the inflator in substantially opposing relation to the circumferentially arranged gas emitting openings 1046. As will be appreciated, the inflator is of a configuration substantially as illustrated in FIGS. 10A and 11A with the view of FIG. 12A being inwardly at the narrow end of the inflator 1040.

It is contemplated that the vent blocking element 1045 may swing freely about the neck of the inflator. As shown, the tethering element 1030 is held in looped relation over a displaceable squib element 1073 which may be fired on demand. As shown, the squib element 1073 is preferably disposed slightly below the centerline of the radius of rotation for the vent blocking element 1045. Accordingly, upon activation of the squib 1073 a pressure force directed against the vent blocking element 1045 is translated into a rotational movement which brings the vent blocking element 1045 downward into the position illustrated in FIG. 12B. As illustrated, the force of activation simultaneously causes the squib 1073 to be displaced away from the vent blocking element 1045 thereby providing clearance to permit the rotation. At the same time, the tethering element 1030 is released from engagement with the squib 1073. Once the vent blocking element 1045 is rotated into a blocking relation with respect to the vent opening 1047 within the housing 1042, this position may thereafter be maintained by engagement with a latch element 1091 which cooperatively hooks over the leading edge of the vent blocking element 1045. Following disengagement from the squib 1073, the tether element 1030 is thereafter free to move in conjunction with the inflation of the air bag cushion 1020. A degree of tethering restraint is preferably nonetheless maintained by length extending tether extension 1023 which may be anchored in fixed or releasable relation to an anchor point such as a stitched attachment point 1027 to an internal or external surface of the air bag cushion 1020.

In FIGS. 13A, 13B and 13C there is illustrated another embodiment wherein components corresponding to those previously described are designated by like reference numerals in an 1100 series. In this embodiment the vent blocking element 1145 is arranged normally forward of gas emitting openings 1146 within the inflator 1140. As shown, the inflator 1140 is arranged at one side of the housing 1142 within a cradling curved contour portion 1143. Such an arrangement may be beneficial in providing substantial room to the side of the inflator for packaging of the air bag cushion 1120 prior to inflation. Within the curved contour portion 1143 a plurality of slotted vent openings 1147 are disposed. Of course only a single vent opening may likewise be utilized if desired. According to the illustrated embodiment, the vent openings are substantially aligned with the gas emitting openings 1146 although they may be positioned outboard of such openings if desired.

As best illustrated in FIG. 13B, this embodiment is in the form of a relatively compact linear arrangement so as to facilitate efficient space utilization. In the illustrated arrangement, a pyrotechnic squib or other pressure generating initiator 1173 is located within an elongate hollow stud element 1138 extending away from the neck of the inflator 1140. A nut 1139 is disposed in overlying relation to the end of the elongate hollow stud element. Upon activation, the initiator 1173 applies pressure to a displaceable sleeve element 1141. As shown, the sleeve element 1141 carries shear tabs 1151 which are normally held in slots located within the hollow stud element 1138. Thus, upon the application of pressure by the initiator, the displaceable sleeve moves in the direction of the arrow and towards the gas emitting openings. According to one potentially preferred practice, it is contemplated that the sleeve element may be in the form of an insert molded part having a metallic substrate overmolded with plastic. Such a construction is believed to reduce noise generation while nonetheless providing superior strength during activation.

As shown, the sleeve element 1141 is affixed to a slide element 1153 which in turn is affixed to the vent blocking element 1145 such that upon movement of the sleeve element 1141, the vent blocking element undergoes a corresponding displacement. The slide element travels within slots 1155 of enlarged configuration at the top and bottom of the hollow stud element 1138. As illustrated in dotted lines, the stroke length of this movement is such that the vent blocking element is moved into a blocking relation between the gas emitting openings 1146 and the vent openings 1147.

Upon this occurrence, an increased quantity of inflation gas is directed into the air bag cushion 1120.

As best illustrated trough simultaneous reference to FIGS. 13A and 13B, tether elements 1130 are formed into internal loop structures 1125 maintained by stitching 1134 or other suitable attachment structures. The internal loop structures 1125 are held in sliding relation over complementary retaining studs 1148 extending inwardly from the end wall of the housing 1142. These retaining studs 1148 are preferably swaged into the end wall and are surrounded by reinforcing beads 1119 of thickened material (FIG. 13C) so as to provide added strength when retaining the tethers.

The retaining studs 1148 extend through aligned openings within a double walled carrier 1164 such that the loop structures are normally held in place between opposing carrier walls 1165, 1166. As best seen in FIG. 13C, the carrier 164 is attached in snap-in relation to the end wall by snap elements 1117. In addition, a threaded carrier stud 1121 extends from the end wall through the carrier 1164 for attachment to the slide element 1153 by use of a press nut 1113. The slide element 1153 has sufficient thickness and structural integrity so as to support the carrier 1164. Thus, upon activation of the initiator, the transitional movement is communicated through the slide 1153 which in turn moves the carrier away from the end cap.

As best seen in FIG. 3C, the movement of the carrier 1164 pushes the loop structures 1125 off of the retaining studs thereby allowing the tethers to be extended to a greater operational length as the vent blocking element 1145 is positioned between the gas outlet openings in the inflator and the vent openings 1147 in the housing 1142. It is contemplated that the coverage by the vent blocking element 1145 may be completely over the vent openings 1147 or may be partially over such openings depending upon desired inflation characteristics. As with prior embodiments, it is contemplated that length extending tether extensions 1123 may acts as mooring lines to provide a secondary tethering restraint by maintaining attachment to the air bag cushion or other anchoring location when the loop elements 1125 are released.

Still another embodiment is illustrated in FIGS. 14A and 14B wherein elements corresponding to those previously described are designated by corresponding reference numerals in a 1200 series. In this embodiment, the housing 1242 is formed with an elongate channel 1292 running along at least a portion of the length of the housing 1242. It is contemplated that the channel 1292 may be formed integrally with the remainder of the housing 1242 or may be a separate attached element. As shown, the channel 1292 has an interior which is bounded by arched side walls such that an element may slide freely within the channel 1292 while nonetheless remaining constrained within the interior. A slotted opening of width less than the interior diameter extends along the length of the channel 1292. The channel 1292 is discontinuous over its length and includes at least one break 1294. The channel is configured so as to accept therein a push rod 1293 which may be advanced through the channel by means of a carrier 1273 operatively connected to a squib activated vent blocking element 1245. The push rod 1293 may also be operatively connected to a tether restraining element carried within the channel 1292. It has been found that the broken configuration of the channel 1292 permits the utilization of a number of tether retaining and release assemblies which are carried within the channel 1293 and are thereafter pushed into the gap 1293 to result in disengagement of the tether from attachment at the housing 1242 as the vent blocking element 1245 is advanced from its normal position in FIG. 14A wherein the vents 1247 are open and the tether 1230 is restrained to a restricted length to the position in FIG. 14B where the vents are closed and the tether is adapted for extension to an enhanced operative length. As with prior embodiments, it is contemplated that length extending tether extensions 1223 may acts as mooring lines to provide a secondary tethering restraint by maintaining attachment to the air bag cushion or other anchoring location when the tethering elements 1230 are released.

A first contemplated arrangement for a moveable tether restraining element as may be used in the arrangement of FIGS. 14A and 14B is illustrated in FIGS. 15A and 15B wherein the terminal end of a tethering element 1330 is clamped within a clamshell element 1395. As shown, the clamshell element 1395 may include a detent element 1396 over which an opening within the tethering element 1330 may be disposed. The detent element 1396 may cooperatively mesh with an indentation 1397 such that a substantially sealed enclosure may be achieved. In operation, the clam shell element 1393 is normally carried within the channel 1292 with the closed hinge edge being affixed to the distal end of the push rod 1293 and the mouth opening projecting towards the gap 1294. Upon movement of the push rod 1293, the clamshell element 1395 may be projected through the channel 1292 until reaching the gap 1294. As clamshell element 1395 emerges into the gap, a progressive opening of the clamshell element may take place. As will be appreciated, this opening is caused to occur by the tension applied to the tethering element 1330 as the overlying airbag cushion (not shown) is inflated. Upon completion of the stroke of the push rod 1293, the clamshell element is preferably held in place by attachment to the push rod 1293.

An alternative tether restraining assembly for use in the arrangement of FIGS. 14A and 14B is illustrated in FIGS. 16A and 16B. As illustrated, in this arrangement a restraining tether 1430 includes one half of a hook and loop fabric 1498 which is mated to a cooperating complementary half of the a hook and loop fabric 1499 within a clamshell element 1497. The clamshell element 1497 is normally housed within the channel 1492 in the manner such as described in relation to FIGS. 15A and 15B such that it cannot be opened. However, upon activation the clamshell element may be pushed into the gap 1294 at which point the restraint against opening is progressively eliminated. As will be appreciated, while the clamshell element 1497 is in the closed position, the tearing action required to separate the cooperating surfaces of the hook and loop fabric 1498 and 1499 may not be achieved. However, as opening occurs, a tensioning force applied to the tethering restraint 1430 gives rise to the requisite tearing action thereby permitting release of the tethering restraint 1430. Upon completion of the stroke of the push rod 1293, the clamshell element 1497 is preferably held in place by attachment to the push rod 1193.

In FIGS. 17A and 17B, several embodiments of hooked tethering attachment elements for use in the arrangement of FIGS. 14A and 14B are illustrated. In the embodiment of FIG. 17A, a plug element 1501 is illustrated which includes a hook structure 1502 over which the air bag tethering element 1530 is held. Upon being pushed into the gap 1294, the plug element 1501 is permitted to rotate due to the application of force by the tethering element 1530 thereby causing the tethering element 1530 to be released. A corresponding structure is illustrated in FIG. 17B wherein the plug element 1501' utilizes a detent element 1503' which may be rotated out of engagement by the application of tension to the tethering element 1530' once the plug element 1501' is pushed into the gap 1294.

In FIG. 18 there is illustrated yet another tether attachment structure useful in the arrangement of FIGS. 14A and 14B incorporating a channel 1292 extending along the housing 1242. In this embodiment, the tethering restraint 1630 is disposed around a carrier element 1605 such as a ball or plug which rides within the channel 1292. Upon being pushed into the gap 1294 by the push rod 1293 the tethering restraint is free to move outwardly away from the channel 1292 as inflation of the corresponding air bag cushion takes place.

It is to be understood that while the present invention has been illustrated and described in relation to potentially preferred embodiments, constructions and procedures, that such embodiments, constructions and procedures are illustrative only and the present invention is in no event to be limited thereto. Rather it is contemplated that modifications and variations embodying the principles of the present invention will no doubt occur to those skilled in the art. It is therefore contemplated and intended that the present invention shall extend to all such modifications and variations as may incorporate the broad aspects of the present invention within the full spirit and scope thereof.

What is claimed is:

1. An air bag assembly for cushioning restraint of an occupant in a vehicle during an impact event, the air bag assembly comprising:

a housing having an interior and an exterior and including at least one vent opening disposed between the interior and the exterior;

an inflator disposed within the housing, the inflator including at least one gas outlet opening and being activatable to discharge inflation gas upon the occurrence of predetermined vehicle conditions;

an inflatable air bag cushion in fluid communication with the inflator such that upon discharge of inflation gas from the inflator the air bag cushion is inflated to a deployed state;

at least one profile restraining tethering element operatively connected to the air bag cushion, the tethering element further being releasably anchored at a first anchor location within the housing and fixedly anchored at least at a second anchor location; and a displaceable vent blocking element selectively moveable in response to predetermined occupant conditions to establish a gas blocking barrier between said at least one gas outlet opening in the inflator and said at least one vent opening in the housing, the vent blocking element being adapted to translate at least one of a dynamic pushing or pulling displacement force to said at least one profile restraining tethering element upon movement of the vent blocking element such that said at least one profile restraining tethering element is forcibly displaced from said first anchor location by said dynamic pushing or pulling force substantially in conjunction with the establishment of a gas blocking barrier between said at least one gas outlet opening in the inflator and said at least one vent opening in the housing such that an increased volume of inflation gas is directed into the air bag cushion when said at least one profile restraining tethering element is displaced from said first anchor location and such that said at least one profile restraining tethering element is extended to an increased operative length extending away from said second anchor location.

2. The invention according to claim 1, wherein the displaceable vent blocking element is moveable in substantially axial relation to the inflator.

3. The invention according to claim 2, wherein the displaceable vent blocking element is of a substantially curved geometry including a concave surface disposed in opposing relation to the inflator.

4. An air bag assembly for cushioning restraint of an occupant in a vehicle during an impact event, the air bag assembly comprising:

a housing having an interior and an exterior and including at least one vent opening disposed between the interior and the exterior;

an inflator disposed within the housing, the inflator including at least one gas outlet opening and being activatable to discharge inflation gas upon the occurrence of predetermined vehicle conditions;

an inflatable air bag cushion in fluid communication with the inflator such that upon discharge of inflation gas from the inflator the air bag cushion is inflated to a deployed state;

at least one profile restraining tethering element operatively connected to the air bag cushion, the tethering element further being releasably anchored at a first anchor location within the housing and fixedly anchored at least at a second anchor location; and a displaceable vent blocking element selectively moveable in response to predetermined occupant conditions to establish a gas blocking barrier between said at least one gas outlet opening in the inflator and said at least one vent opening in the housing, the vent blocking element comprising a leading edge projecting in the direction of movement along the inflator and a wall portion normally disposed adjacent to an end wall of the housing, the wall portion of the displaceable vent blocking element including at least one slotted opening therein for acceptance of a stationary pin element extending inwardly into the housing, the stationary pin element being adapted to extend through a loop element operatively connected to said at least one profile restraining tethering element such that the loop element is normally held over the stationary pin element between the wall portion of the displaceable vent blocking element and said end wall of the housing such that upon movement of the displaceable vent blocking element away from said end wall the stationary pin element is disengaged from said at least one slotted opening within the wall portion of the displaceable vent blocking element whereby the loop element may be pulled away from the stationary pin element as tension is applied to said at least one profile restraining tethering element.

5. The invention as recited in claim 4, wherein a leaf spring element is disposed at the stationary pin element for disposition between the loop element and the end wall of the housing such that upon movement of the displaceable vent blocking element away from said end wall, the leaf spring element pushes the loop element away from the end wall.

6. An air bag assembly for cushioning restraint of an occupant in a vehicle during an impact event, the air bag assembly comprising:

a housing having an interior and an exterior and including at least one vent opening disposed between the interior and the exterior;

an inflator disposed within the housing, the inflator including at least one gas outlet opening and being activatable to discharge inflation gas upon the occurrence of predetermined vehicle conditions;

an inflatable air bag cushion in fluid communication with the inflator such that upon discharge of inflation gas from the inflator the air bag cushion is inflated to a deployed state;

at least one profile restraining tethering element operatively connected to the air bag cushion, the tethering element further being releasably anchored at a first anchor location within the housing and fixedly anchored at a second anchor location; and a displaceable vent blocking element selectively moveable in response to predetermined occupant conditions to establish a gas blocking barrier between said at least one gas outlet opening in the inflator and said at least one vent opening in the housing, wherein the vent blocking element blocking element is operatively connected to a pin element including a leg portion projecting towards an end wall of the housing, a stationary box channel element being affixed at the end wall of the housing and extending inwardly into the housing in the direction of movement of the displaceable vent blocking element, an expansible clip element being operatively connected to said at least one profile restraining tethering element and adapted to be inserted into the stationary box channel element such that upon insertion of the expansible clip element into the stationary box channel element a pin accepting opening within the expansible clip element is disposed in alignment with an aperture within the stationary box channel element in substantial alignment with the leg portion of the pin element projecting towards the end wall of the housing, the leg portion of the pin element being normally disposed through the aligned aperture within the stationary box channel element and the pin accepting opening within the expansible clip element such that a pair of hooked legs extending away from the pin accepting opening are normally spread in locking relation beneath the stationary box channel element such that the expansible clip element is normally held within the stationary box channel element and such that upon movement of the displaceable vent blocking element away from said end wall, the leg portion of the pin element is disengaged from the expansible clip element and the expansible clip element may be pulled away from the stationary box channel element as tension is applied to said at least one profile restraining tethering element.

7. An air bag assembly for cushioning restraint of an occupant in a vehicle during an impact event, the air bag assembly comprising:

a housing having an interior and an exterior and including at least one vent opening disposed between the interior and the exterior;

an inflator disposed within the housing, the inflator including at least one gas outlet opening and being activatable to discharge inflation gas upon the occurrence of predetermined vehicle conditions;

an inflatable air bag cushion in fluid communication with the inflator such that upon discharge of inflation gas from the inflator the air bag cushion is inflated to a deployed state;

at least one profile restraining tethering element operatively connected to the air bag cushion, the tethering element further being releasably anchored at a first anchor location within the housing and fixedly anchored at a second anchor location; and a displaceable vent blocking element selectively moveable in response to predetermined occupant conditions to establish a gas blocking barrier between said at least one gas outlet opening in the inflator and said at least one vent opening in the housing, the vent blocking element being operatively connected to an upwardly extending forked extension including a first upright bar, a cross bar projecting away from the first upright bar towards an end wall of the housing and away from the direction of movement of the displaceable vent blocking element and a second upright bar extending away from the cross bar at a location closer to the end wall than the first upright bar, the end wall including a pair of stationary pin elements extending inwardly away from the end wall in outboard relation to the forked extension, the stationary pin elements being adapted to extend through a loop element operatively connected to said at least one profile restraining tethering element such that the loop element is normally held around the stationary pin elements and over the cross bar between the first upright bar and the second upright bar such that upon movement of the displaceable vent blocking element away from said end wall the second upright bar pulls the loop element away from the stationary pin elements.

8. The invention according to claim 1, wherein the displaceable vent blocking element is moveable in substantially transverse relation to the inflator.

9. The invention according to claim 8, wherein said at least one profile restraining tethering element is affixed to a locking tab element held in place by a stationary clip element and wherein the displaceable vent blocking element is adapted to impact the locking tab element upon being moved by a pressure applying driving element such that the displaceable vent blocking element pushes the locking tab element out of engagement with the stationary clip element.

10. The invention according to claim 8, wherein said at least one profile restraining tethering element is affixed to a break-away ring frangibly attached to a base element secured in place within the housing and wherein the displaceable vent blocking element is configured to impact the break-away ring upon being moved by a driving element such that the break-away ring is broken away from the base element and said at least one profile restraining tethering element is correspondingly extended to an enhanced operative length.

11. The invention according claim 10, wherein the break-away ring includes an internal bridge member to prevent disengagement of the break-away ring from said at least one profile restraining tethering element.

12. The invention according to claim 8, wherein said at least one profile restraining tethering element is affixed to a pin element secured within a mating sleeve, the pin element being held in place within the mating sleeve by at least one breakable shear tab such that a distal end of the pin element projects outwardly from the mating sleeve and towards the displaceable vent blocking element and wherein the displaceable vent blocking element is adapted to impact the distal end of the pin element upon being moved by a driving element such that upon impact the displaceable vent blocking element breaks the shear tab and the pin element is released from the mating sleeve.

13. The invention according to claim 8, wherein said at least one profile restraining tethering element is affixed over an anchoring hitch element and wherein the displaceable vent blocking element includes a bordered key opening normally disposed over the anchoring hitch such that said at least one profile restraining tethering element extends away from the anchoring hitch and through the key opening and such that upon movement of the displaceable vent blocking element by a driving element, the vent blocking element pushes said at least one profile restraining tethering element away from said anchoring hitch and said at least one profile restraining tethering element is pulled through the key opening as tension is applied during inflation of the air bag cushion.

14. An air bag assembly for cushioning restraint of an occupant in a vehicle during an impact event, the air bag assembly comprising:

a housing having an interior and an exterior and including at least one vent opening disposed between the interior and the exterior;

an inflator disposed within the housing, the inflator including at least one gas outlet opening and being activatable to discharge inflation gas upon the occurrence of predetermined vehicle conditions;

an inflatable air bag cushion in fluid communication with the inflator such that upon discharge of inflation gas from the inflator the air bag cushion is inflated to a deployed state;

at least one profile restraining tethering element operatively connected to the air bag cushion, the tethering element further being releasably anchored at a first anchor location within the housing; and a displaceable vent blocking element selectively moveable in response to predetermined occupant conditions to establish a gas blocking barrier between said at least one gas outlet opening in the inflator and said at least one vent opening in the housing, wherein the displaceable vent blocking element is moveable in sliding relation along a side wall of the housing adjacent to said inflator.

15. The invention according to claim 14, wherein the displaceable vent blocking element comprises an elongate plate structure carried within a support channel extending along said side wall, the displaceable vent blocking element including a proximal end operatively connected to a force generating driving element activatable to move the displaceable vent blocking element within the support channel, the displaceable vent blocking element further including a distal end projecting in the direction of movement and lateral edges extending between the proximal and distal ends, wherein a key slot extends inwardly from a first one of the lateral edges, said key slot including a nose portion projecting towards the distal end of the displaceable vent blocking element, and wherein a tether retaining pin element projects away from said side wall and into the interior of the housing, the tether retaining pin element normally extending through the nose portion of said key slot, said at least one profile restraining tethering element including a loop element normally disposed in sliding relation over the tether retaining pin element such that a portion of said at least one profile restraining tethering element normally extends between said side wall and a portion of the displaceable vent blocking element adjacent to the nose portion of said key slot, the key slot further including an open portion extending away from said first one of the lateral edges such that upon activated movement of the displaceable vent blocking element in the direction of the distal end, the open portion of the key slot is shifted over the tether retaining pin element, whereby said at least one profile restraining tethering element is released from constriction between said side wall and the displaceable vent blocking element such that said at least one profile restraining tethering element is slideable away from the tether retaining pin element upon application of a tensioning force.

16. The invention as recited in claim 15, wherein the tether retaining pin element is angled upwardly.

17. The invention according to claim 14, wherein the displaceable vent blocking element comprises an elongate plate structure carried within a support channel extending along said side wall, the displaceable vent blocking element including a proximal end operatively connected to a force generating driving element activatable to move the displaceable vent blocking element within the support channel, the displaceable vent blocking element further including a distal end projecting in the direction of movement, wherein a stationary clip element is affixed to said side wall in overlying relation to the displaceable vent blocking element, the stationary clip element including a finger projection projecting in the direction of movement of the displaceable vent blocking element, said at least one profile restraining tethering element including a loop element normally disposed in sliding relation over the finger projection, said at least one profile restraining tethering element further being connected by a frangible attachment element to a portion of the displaceable vent blocking element such that upon activated movement of the displaceable vent blocking element in the direction of the distal end, the frangible attachment element carries said at least one profile restraining tethering element away from the finger projection and is thereafter held in place by the frangible attachment element until released by the application of a tensioning force.

18. An air bag assembly for cushioning restraint of an occupant in a vehicle during an impact event, the air bag assembly comprising:

a housing having an interior and an exterior and including at least one vent opening disposed between the interior and the exterior;

an inflator disposed within the housing, the inflator including at least one gas outlet opening and being activatable to discharge inflation gas upon the occurrence of predetermined vehicle conditions;

an inflatable air bag cushion in fluid communication with the inflator such that upon discharge of inflation gas from the inflator the air bag cushion is inflated to a deployed state;

at least one profile restraining tethering element operatively connected to the air bag cushion, the tethering element further being releasably anchored at a first anchor location within the housing; and a displaceable vent blocking element selectively moveable in response to predetermined occupant conditions to establish a gas blocking barrier between said at least one gas outlet opening in the inflator and said at least one vent opening in the housing, wherein the displaceable vent blocking element is moveable in rotating relation at least partially around said inflator in overlying relation to said at least one gas outlet opening and wherein the tethering element is concurrently released from said first anchor location within the housing and extended to an increased operative length.

19. An air bag assembly for cushioning restraint of an occupant in a vehicle during an impact event, the air bag assembly comprising:

a housing having an interior and an exterior, the housing comprising at least one vent opening disposed between the interior and the exterior;

at least one retaining stud projecting inwardly from a wall of the housing;

an inflator disposed within the housing, the inflator including at least one gas outlet opening and being activatable to discharge inflation gas upon the occurrence of predetermined vehicle conditions;

an inflatable air bag cushion in fluid communication with the inflator such that upon discharge of inflation gas from the inflator the air bag cushion is inflated to a deployed state;

at least one profile restraining tethering element operatively connected to the air bag cushion, said at least one profile restraining tethering element further being releasably anchored in sliding relation over said at least one retaining stud; and a displaceable vent blocking element selectively moveable in response to predetermined occupant conditions to establish a gas blocking barrier between said at least one gas outlet opening in the inflator and said at least one vent opening in the housing, the vent blocking element being operatively connected to a carrier element, said carrier element comprising a first wall and at least a second wall in substantially opposing relation to the first wall such that a gap is disposed between the first wall and the second wall, the carrier element including an acceptance opening for acceptance of said at least one retaining stud such that said at least one retaining stud normally extends across the gap between the first wall and the second wall and wherein said at least one profile restraining tethering element is normally held over said at least one retaining stud between the first wall and the second wall so as to extend outwardly away from the carrier element through the gap, the carrier element being displaceable away from said at least one retaining stud in conjunction with displacement of the vent blocking element such that said at least one profile restraining tethering element is forcibly carried away from said at least one retaining stud substantially in conjunction with the establishment of a gas blocking barrier between said at least one gas outlet opening in the inflator and said at least one vent opening in the housing such that an increased volume of inflation gas is directed into the air bag cushion when said at least one profile restraining tethering element is displaced from said at least one retaining stud and such that said at least one profile restraining tethering element is extended to an increased operative length.

20. The invention as recited in claim 19, comprising a plurality of retaining studs projecting inwardly from an end wall of the housing.

21. The invention as recited in claim 19, wherein said at least one retaining stud is held in swaged relation within an end wall of the housing at a location of enhanced thickness.

22. The invention as recited in claim 19 wherein said carrier is releasably attached in snap-in relation at an end wall of the housing.

23. The invention as recited in claim 19, wherein the air bag assembly includes a pressure generating squib in substantial alignment with a displaceable sleeve element operatively attached to said vent blocking element such that upon activation of said squib, said sleeve element is displaced from its normal position so as to move said vent blocking element at least partially over said at least one vent opening while simultaneously displacing the carrier element away from said at least one retaining stud.

24. The invention as recited in claim 23, wherein said displaceable sleeve is of an insert molded construction comprising a metal substrate overmolded with plastic.

25. The invention according to claim 1, wherein said housing includes a segmented channel structure adapted to slidingly contain therein a rod element moveable in conjunction with the displaceable vent blocking element, the rod element being further operatively attached to a moveable tether attachment element normally contained at a fixed position within the channel structure, the rod element and tether attachment element being moveable in the direction of a gap within the channel structure upon movement of the displaceable vent blocking element, such that upon movement of the displaceable vent blocking element the moveable tether attachment element passes at least partially into the gap and said at least one profile restraining tethering element is released from the moveable tether attachment element.

26. The invention according to claim 25, wherein the moveable tether attachment element comprises a containment structure of a substantially clamshell configuration including a mouth opening projecting in the direction of the gap within the channel such that upon being pushed into the gap the moveable tether attachment element undergoes progressive opening as tension is applied to said at least one profile restraining tethering element.

27. The invention according to claim 26, wherein said at least one profile restraining tethering element is held in sliding relation over a detent element within the containment structure.

28. The invention according to claim 26, wherein said at least one profile restraining tethering element is held within the containment structure by a hook and loop fabric.

29. The invention according to claim 25, wherein the moveable tether attachment element comprises a rotatable plug element, the plug element being normally restricted against rotation while disposed within the channel structure but being freely rotatable within the gap, the plug element being further adapted to disengage from said at least one profile restraining tethering element upon the occurrence of rotation induced by the application of tension to said at least one profile restraining tethering element.

30. The invention according to claim 29, wherein the plug element includes an integral hook structure to engage said at least one profile restraining tethering element.

31. The invention according to claim 30, wherein the plug element includes an integral detent element to engage said at least one profile restraining tethering element.

32. The invention according to claim 25, wherein the moveable tether attachment element comprises a sliding ball element riding within the channel.

* * * * *